United States Patent
Shin et al.

(10) Patent No.: US 10,736,002 B2
(45) Date of Patent: Aug. 4, 2020

(54) DEVICE FOR PERFORMING COMMUNICATION IN WIRELESS COMMUNICATION SYSTEM AND METHOD THEREOF

(71) Applicant: Samsung Electronics Co., Ltd., Gyeonggi-do (KR)

(72) Inventors: In Young Shin, Seoul (KR); Se Hee Han, Seoul (KR); Sung Dong Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/896,630

(22) Filed: Feb. 14, 2018

(65) Prior Publication Data

US 2018/0234895 A1    Aug. 16, 2018

(30) Foreign Application Priority Data

Feb. 14, 2017    (KR) .................. 10-2017-0020097

(51) Int. Cl.
| | |
|---|---|
| *H04W 36/00* | (2009.01) |
| *H04W 76/16* | (2018.01) |
| *H04W 4/40* | (2018.01) |
| *H04W 4/46* | (2018.01) |
| *H04W 4/80* | (2018.01) |

(Continued)

(52) U.S. Cl.
CPC ......... *H04W 36/0066* (2013.01); *H04W 4/40* (2018.02); *H04W 4/46* (2018.02); *H04W 4/80* (2018.02); *H04W 72/1215* (2013.01); *H04W 76/14* (2018.02); *H04W 76/15* (2018.02); *H04W 76/16* (2018.02); *H04W 4/70* (2018.02)

(58) Field of Classification Search
None
See application file for complete search history.

(56) References Cited

U.S. PATENT DOCUMENTS 9,521,238 B1   12/2016  Thanayankizil et al.
9,521,589 B2   12/2016  Lee et al.
(Continued)

FOREIGN PATENT DOCUMENTS

KR   1020150087841   7/2015
KR   10-1555252      9/2015
(Continued)

OTHER PUBLICATIONS

Qualcomm, "Cellular Vehicle-to-Everything (C-V2X) Technologies", Jun. 7, 2016, 40 pages.
(Continued)

*Primary Examiner* — Eunsook Choi
(74) *Attorney, Agent, or Firm* — The Farrell Law Firm, P.C.

(57) ABSTRACT

An electronic device is disclosed and includes a communication circuit supporting a first communication method and a second communication method, and at least one processor electrically connected to the communication circuit. The at least one processor is configured to obtain connection information about at least one electronic device during communication using the first communication method, and to perform communication connection to one electronic device of the at least one electronic device through the second communication method by using the obtained connection information.

18 Claims, 20 Drawing Sheets

(51) Int. Cl.
*H04W 76/14* (2018.01)
*H04W 76/15* (2018.01)
*H04W 72/12* (2009.01)
*H04W 4/70* (2018.01)

(56) References Cited

U.S. PATENT DOCUMENTS

| | | | |
|---|---|---|---|
| 9,775,107 B2* | 9/2017 | Iwami | H04W 92/18 |
| 9,788,350 B2 | 10/2017 | Park et al. | |
| 9,826,015 B2* | 11/2017 | Kuhn | H04L 65/607 |
| 10,099,616 B2* | 10/2018 | Kim | B60R 1/00 |
| 10,122,801 B2* | 11/2018 | Kafle | H04B 17/318 |
| 10,433,126 B2* | 10/2019 | Lee | H04W 4/046 |
| 10,433,317 B2* | 10/2019 | Park | H04W 72/0446 |
| 2014/0323049 A1 | 10/2014 | Park et al. | |
| 2015/0296416 A1* | 10/2015 | Lee | H04W 8/005 370/331 |
| 2016/0277878 A1 | 9/2016 | Lee | |
| 2018/0020491 A1 | 1/2018 | Park et al. | |
| 2018/0049220 A1* | 2/2018 | Patil | H04W 72/0426 |
| 2018/0092017 A1 | 3/2018 | Freda et al. | |
| 2018/0124574 A1 | 5/2018 | Byun et al. | |
| 2018/0199194 A1* | 7/2018 | Xu | H04W 4/046 |
| 2019/0075447 A1* | 3/2019 | Lee | H04W 4/02 |
| 2019/0098589 A1* | 3/2019 | Chae | H04W 72/042 |

FOREIGN PATENT DOCUMENTS

| | | |
|---|---|---|
| KR | 1020160111211 | 9/2016 |
| WO | WO 2016/164808 | 10/2016 |
| WO | WO 2016/200213 | 12/2016 |

OTHER PUBLICATIONS

Sangsoo Jeong et al., "A Hybrid V2X System for Safety-Critical Applications in VANET", 2016 IEEE 4th International Conference on Cyber-Physical Systems, Networks and Applications, Oct. 6, 2016, 6 pages.
International Search Report dated May 16, 2018 issued in counterpart application No. PCT/KR2018/001844, 11 pages.
European Search Report dated May 22, 2018 issued in counterpart application No. 18156483.2-1213, 13 pages.

* cited by examiner

DEVICE FOR PERFORMING COMMUNICATION IN WIRELESS COMMUNICATION SYSTEM AND METHOD THEREOF

PRIORITY

This application claims priority under 35 U.S.C. § 119(a) to Korean Patent Application Serial No. 10-2017-0020097, which was filed in the Korean Intellectual Property Office on Feb. 14, 2017, the entire content of which is incorporated herein by reference.

BACKGROUND

1. Field of the Disclosure

The present disclosure relates generally to a vehicle-to-everything (V2X) communication technology and a wireless-fidelity (Wi-Fi) direct communication technology.

2. Description of the Related Art

With the development of information communication technologies, various wireless communication technologies have been recently introduced. The communication technologies have been under research to realize a connected car or an autonomous vehicle, which attracts attention as a core of the future automobile industry. Various standard organizations are establishing V2X communication technology. V2X communication refers to a communication technology in which a vehicle and other electronic devices exchange signals while communicating with each other through a wireless and/or wired network. The $3^{rd}$ generation partnership project (3GPP) is trying to make the standard based on a long term evolution-device to device technology (LTE-D2D) designed for a disaster safety network. The Institute of Electrical and Electronics Engineers (IEEE) 1609.x developed from dedicated short range communication (DSRC) and the communication standard of wireless access in vehicular environments (WAVE) composed of IEEE802.11 standard has also been established. The newly defined cooperative driving message is scheduled to be released to the Society of Automotive Engineers (SAE), and new technical specifications such as handover, etc. are to be released to intelligent transport systems (ITS) R2 of the European Telecommunications Standard Institute (ETSI). In $5^{th}$ generation (5G), etc., the V2X-related standardization gets under way.

V2X communication may improve safety by coordinating vehicles and other electronic devices in various driving environments, such as bad weather, a hazardous road section, etc., and may provide a user with additional information based on the location information.

V2X communication complying with a specific communication protocol may support a vehicle movement speed of 110 km/h or more. In V2X communication system, the switching between a service channel (SCH) and a control channel (CCH) may be made at a period of 100 ms. CCH or SCH may have a time slot interval of 50 ms. V2X communication may secure a data rate from 3 Mbps to 15 Mbps. V2X communication may support a coverage distance of 500 m to 1 km.

V2X communication may provide various services such as the transmission of a simple alarm message, the transmission of image information, etc. However, V2X communication may not be suitable to transmit high-capacity data (e.g., high-definition real-time image) due to the limited data rate. A heterogeneous communication network may be used in the case where there is a need to transfer high-capacity data in a V2X environment.

Of the Wi-Fi communication technologies, Wi-Fi direct may be suitable for an ad-hoc environment, may have a low cost, and may secure a high data rate (e.g., 250 Mbps). However, Wi-Fi direct communication may have a significant delay, for example, 5 to 10 seconds, at the start of Wi-Fi connection setup. Since Wi-Fi direct communication has a relatively small coverage area, connection and disconnection may be repeated in a vehicle moving environment in which a distance between cars is frequently changed.

SUMMARY

Accordingly, an aspect of the preset disclosure provides an electronic device, and a method that effectively transceives high-capacity data by rapidly moving from V2X communication to Wi-Fi direct communication.

In accordance with an aspect of the present disclosure, an electronic device includes a communication circuit configured to support a first communication method and a second communication method; and at least one processor electrically connected to the communication circuit. The at least one processor is configured to obtain connection information about at least one electronic device during communication using the first communication method; and perform communication connection to one electronic device of the at least one electronic device through the second communication method by using the obtained connection information.

In accordance with an aspect of the present disclosure, a method in which an electronic device performs communication includes obtaining connection information about at least one electronic device through V2X communication; connecting to one electronic device of the at least one electronic device through Wi-Fi direct communication by using the obtained connection information; and receiving data from the one electronic device through the Wi-Fi direct communication.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
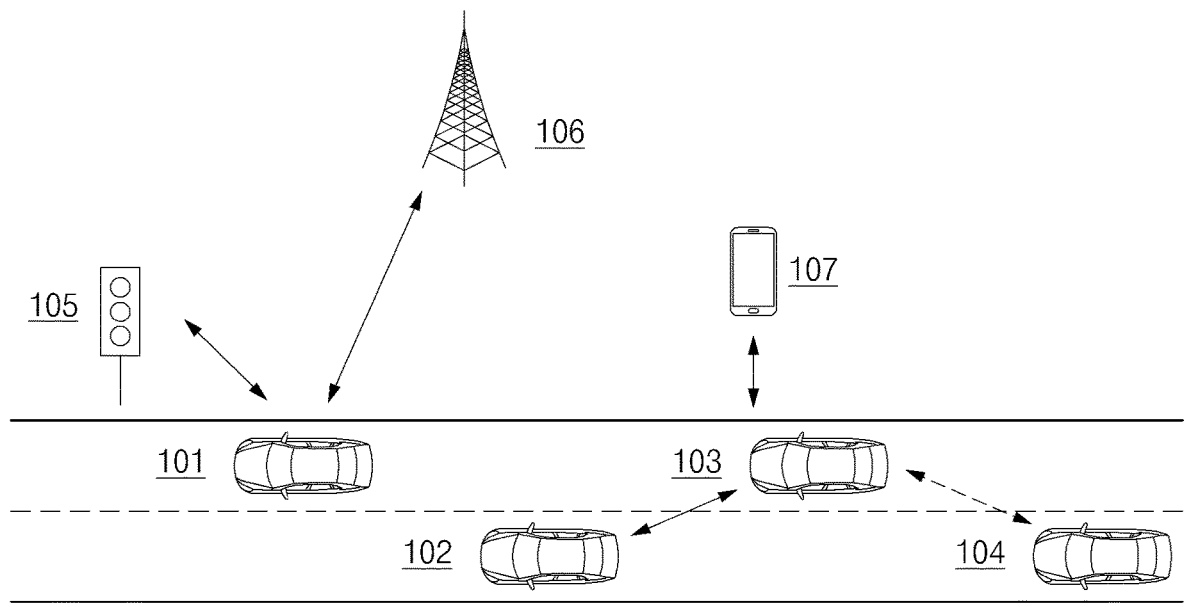
FIG. 1 illustrates a network environment capable of being applied to various embodiments of the present disclosure.

Hereinafter, embodiments of the present disclosure are described in greater detail with reference to the accompanying drawings. Those of ordinary skill in the art will recognize that modifications, equivalents, and/or alternatives on the various embodiments described herein can be made without departing from the scope and spirit of the present disclosure. The same reference numbers may be used throughout the drawings to refer to the same or like parts.

The expressions "have", "may have", "include", "comprise", "may include", and "may comprise" used herein indicate the existence of corresponding features (e.g., elements such as numeric values, functions, operations, or components) but do not exclude the presence of additional features.

In this disclosure, the expressions "A or B", "at least one of A and/or B", or "one or more of A and/or B", etc. may include any and all combinations of one or more of the associated listed items. For example, the term "A or B", "at least one of A and B", or "at least one of A or B" may refer to all of the cases (1) where at least one A is included, the case (2) where at least one B is included, or the case (3) where both of at least one A and at least one B are included.

The expressions, such as "a first", "a second", "the first", or "the second" used in describing various embodiments of the present disclosure may be used to refer to various elements regardless of the order and/or the priority, and to distinguish the relevant elements from other elements, but do not limit the elements. For example, "a first user device" and "a second user device" indicate different user devices regardless of the order or priority. For example, without departing the scope of the present disclosure, a first element may be referred to as a second element, and similarly, a second element may be referred to as a first element. The term "and/or" covers a combination of a plurality of items, or any of the plurality of items.

When an element (e.g., a first element) is referred to as being "(functionally or communicatively) connected", or "directly coupled" to another element (e.g., a second element), the element may be connected directly to another element or connected to another element through yet another element (e.g., a third element). The expression "configured to" as used in this disclosure may be used interchangeably with, for example, the expressions "suitable for", "having the capacity to", "designed to", "adapted to", "made to", or "capable of". The term "configured to" does not mean only "specifically designed to" in hardware. Instead, the expression "a device configured to" may mean that the device is "capable of" operating together with another device or other components. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in this disclosure are used to describe specific embodiments and are not intended to limit the scope of the present disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of this disclosure. In some cases, even if terms are terms which are defined in this disclosure, they may not be interpreted to exclude embodiments of this disclosure.

An electronic device according to various embodiments of this disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), motion picture experts group (MPEG-1 or MPEG-2) Audio Layer 3 (MP3) players, mobile medical devices, cameras, or wearable devices. The wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or a bio-implantable type (e.g., an implantable circuit).

According to various embodiments of the present disclosure, the electronic device may be a home appliance. The home appliances may include at least one of, for example, televisions (TVs), digital versatile disc (DVD) players, audio players, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, etc.

According to an embodiment of the present disclosure, an electronic device may include at least one of various medical devices (e.g., portable medical measurement devices (e.g., a blood glucose monitoring device, a heartbeat measuring device, a blood pressure measuring device, a body temperature measuring device, etc.), a magnetic resonance angiography (MRA) apparatus, a magnetic resonance imaging (MRI) apparatus, a computed tomography (CT) machine, a scanner, and an ultrasonic devices), a navigation device, a global navigation satellite system (GNSS), an event data recorder (EDR), a flight data recorder (FDR), a vehicle infotainment device, an electronic equipment for a ship (e.g., a navigation system and a gyro-compass), avionics, security devices, an automotive head unit, a robot for home or industry, an automatic teller machine (ATM), a points of sales (POS) device, or an Internet of things (IoT) device (e.g., a light bulb, various sensors, electric or gas meters, a sprinkler device, a fire alarm, a thermostat, a street lamp, a toaster, exercise equipment, a hot water tank, a heater, a is boiler, etc.).

According to an embodiment of the present disclosure, the electronic device may include at least one of a part of furniture or a building/structure, an electronic board, an electronic signature receiving device, a projector, or various types of measuring instruments (e.g., a water meter, an electricity meter, a gas meter, a wave meter, etc.). The electronic device may be one of the above-described devices or a combination thereof The electronic device may be a flexible electronic device. Furthermore, the electronic device is not limited to the above-described electronic devices and may include other electronic devices and new electronic devices according to developing technologies.

In the present disclosure, the term "user" may refer to a person using an electronic device or may refer to a device (e.g., an artificial intelligence electronic device) that uses the electronic device.

FIG. 1 illustrates a network environment capable of being applied to various embodiments of the present disclosure.

According to various embodiments of the present disclosure, the electronic may operate in the network environment complying with heterogeneous communication protocols. For example, an electronic device disclosed in the present disclosure may perform a first communication method and/or a second communication method. The first communication method and/or the second communication method may be a machine-to-machine communication method. The second communication method may be a communication method different from the first communication method. The coverage area according to the first communication method may be wider than the coverage area according to the second communication method. The throughput according to the second communication method may be larger than the throughput according to the first communication method. The first communication method may be V2X communication, and the second communication method may be Wi-Fi communication.

V2X communication may include vehicle-to-vehicle (V2V) for communication between a vehicle and another vehicle, vehicle-to-infra (V2I) for communication between vehicle and infrastructure, and vehicle-to-nomadic (V2N) for communication between a vehicle and a mobile terminal.

V2I refers to a communication technology capable of exchanging traffic situation information such as an accident, a traffic volume, etc. in real time between a vehicle supporting V2X and the infrastructure such as a base station installed near a road, etc.

Referring to FIG. 1, a first vehicle 101 may transmit or receive a signal to or from a first device 105 or a second device 106 through V2I communication. The first device 105 or the second device 106 may be the infrastructure such as a traffic light or a base station.

V2V refers to a communication technology capable of exchanging information such as a front-back situation, a vehicle-to-vehicle distance, a traveling speed, a collision warning, etc., between a vehicle and another vehicle. A second vehicle 102 and a third vehicle 103 may transmit or receive a signal through V2V communication.

The third vehicle 103 may communicate with a third device 107 through V2N communication. The third device 107 may be a mobile electronic device.

According to an embodiment of the present disclosure, the electronic device may support Wi-Fi direct communication. The Wi-Fi direct may be the Wi-Fi communication of an ad-hoc mode. The electronic device performing Wi-Fi direct may transmit or receive a signal to or from a counterpart electronic device without an access point (AP). The third vehicle 103 and a fourth vehicle 104 may transmit or receive high-definition data through Wi-Fi direct communication.

According to various embodiment of the present disclosure, V2X communication may comply with a protocol described in a communication specification such as IEEE1609.x, IEEE802.11p, SAE J2945, 3GPP 36.211, or 3GPP36.212. The Wi-Fi direct communication may comply with a Wi-Fi direct communication protocol disclosed by Wi-Fi alliance.

The first vehicle 101, the second vehicle 102, the third vehicle 103, the fourth is vehicle 104, the first device 105, the second device 106, and/or the third device 107 may be referred to as an electronic device or a relay device in the present disclosure.

Figure 2:
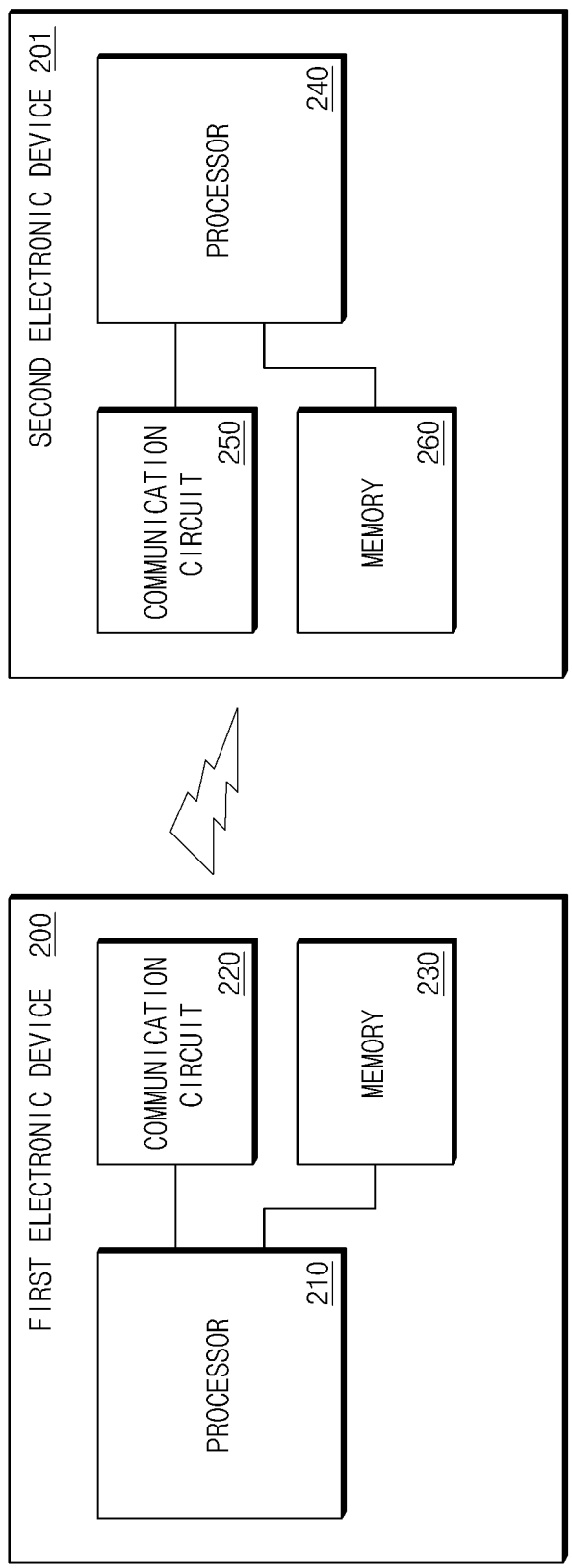
FIG. 2 illustrates a block diagram of a communication system, according to an embodiment of the present disclosure.

FIG. 2 illustrates a block diagram of a communication system, according to an embodiment of the present disclosure.

Referring to FIG. 2, a communication system may include a first electronic device 200 and a second electronic device 201. The first electronic device 200 and the second electronic device 201 may support V2X communication and/or Wi-Fi direct communication.

Hereinafter, the first electronic device 200 may perform V2X communication or Wi-Fi direct communication. The first electronic device 200 may mean a sink device or a host device that is capable of receiving data (e.g., a video stream) from the second electronic device 201 through Wi-Fi direct communication. The second electronic device 201 may perform V2X communication or Wi-Fi direct communication. The second electronic device 201 may be a counterpart terminal of the first electronic device 200. The second electronic device 201 may mean a source device capable of transmitting data to the first electronic device 200 through Wi-Fi direct communication.

The first electronic device 200 may include a processor 210, a communication circuit 220, and a memory 230.

According to various embodiments of the present disclosure, the processor 210 may perform an operation and may control another element (e.g., the communication circuit 220). The processor 210 may connect to the second electronic device 201 through Wi-Fi direct communication by using information that is received through the communication circuit 220 or is extracted from the memory 230. The processor 210 may control the communication circuit 220 to perform V2X communication or Wi-Fi direct communication. The processor 210 may manage the information stored in the memory 230. For example, the processor 210 may extract or update the information stored in the memory 230.

The second electronic device 201 may include a processor 240, a communication circuit 250, and a memory 260.

According to various embodiments of the present disclosure, the processor 240 may perform an operation and may control the operation of another element (e.g., the communication circuit 250). The processor 240 may determine whether to transmit data to the first electronic device 200, by using information that is received through the communication circuit 250 or is extracted from the memory 260. The processor 240 may control the communication circuit 250 to perform V2X communication or Wi-Fi direct communication. The processor 240 may manage the information stored in the memory 260.

The first electronic device 200 and/or the second electronic device 201 may further include an output device that outputs the received information. According to an embodiment of the present disclosure, the first electronic device 200 and/or the second electronic device 201 may use a separate output device to output the received information.

The first electronic device 200 and/or the second electronic device 201 may further include an input device that obtains a user input. According to an embodiment of the present disclosure, the first electronic device 200 and/or the second electronic device 201 may use a separate input device.

According to an embodiment of the present disclosure, the first electronic device 200 and/or the second electronic device 201 may include a sensing device that obtains information (e.g., image information) about the external environment. The first electronic device 200 and/or the second electronic device 201 may be connected to a separate sensing device. The first electronic device 200 and/or the second electronic device 201 may obtain sensing data or image information (e.g., a video stream) through the sensing device.

The first electronic device 200 and/or the second electronic device 201 may be mounted in a vehicle or may be attached to the vehicle.

The configuration of the first electronic device 200 or the second electronic device 201 mentioned above is only an example, and it is possible for various modifications to be implemented within the scope of the present disclosure. For example, the first electronic device 200 may include a configuration such as a vehicle communication system 300 or may be changed by changing the configuration of the electronic device.

Figure 3:
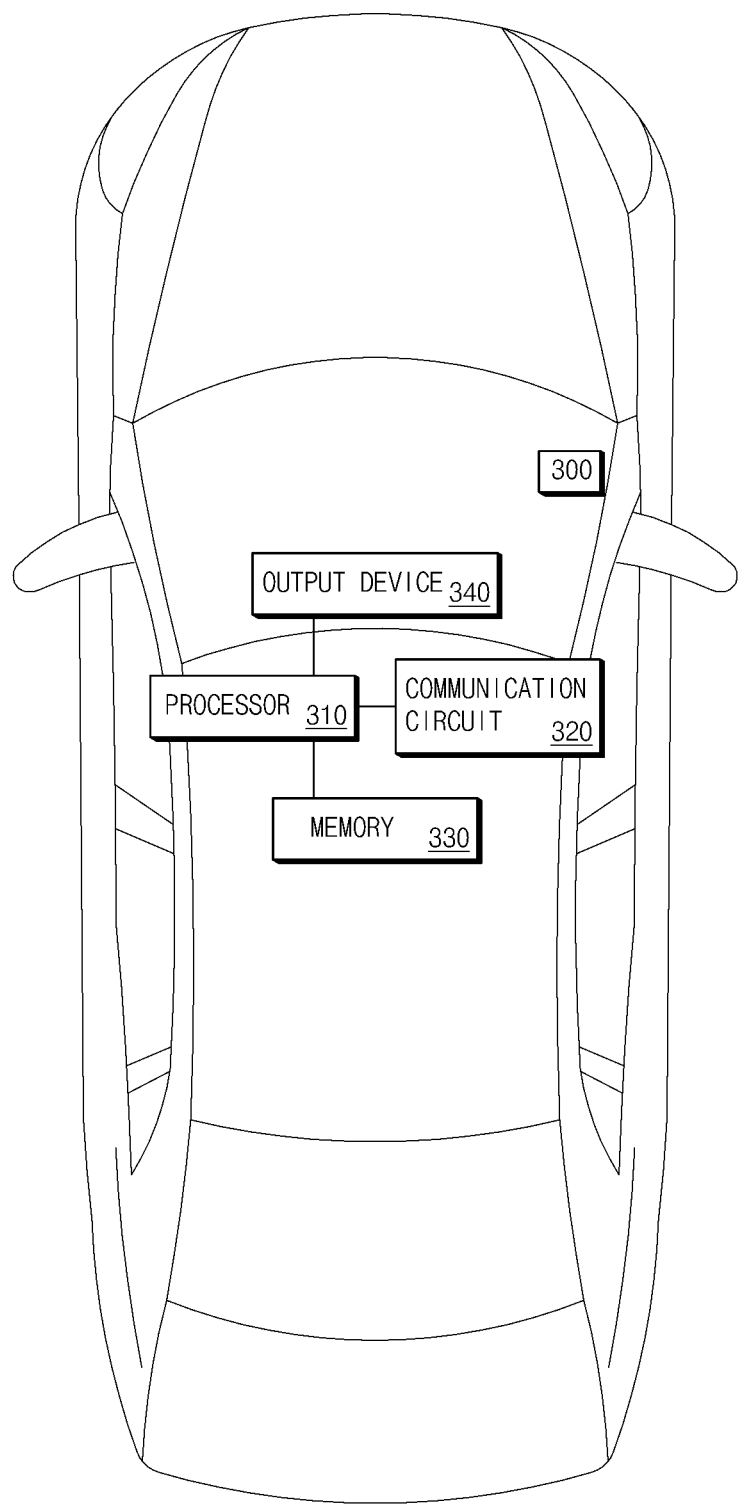
FIG. 3 illustrates a block diagram of a vehicle communication system, according to an embodiment of the present disclosure.

FIG. 3 illustrates a block diagram of a vehicle communication system, according to an embodiment of the present disclosure.

Referring to FIG. 3, the vehicle communication system 300 may include a processor 310, a communication circuit 320, a memory 330, and/or an output device 340. Since the processor 310, the communication circuit 320, and the memory 330 overlap the processor 210, the communication circuit 220, and the memory 230, the processor 240, the communication circuit 250, and the memory 260, duplicated descriptions are not repeated.

According to an embodiment of the present disclosure, the processor 310 may obtain information about electronic devices at a periphery of the vehicle communication system 300 in advance and may store the information in the memory 330. The processor 310 may classify the information about the electronic devices at a periphery of the vehicle communication system 300 and may store the result in the memory 330. For example, the information about the electronic devices at a periphery of the vehicle communication system 300 may include Wi-Fi direct information. While the processor 310 performs V2X communication, the processor 310 may obtain the information about the electronic devices at a periphery of the vehicle communication system 300. The processor 310 may directly obtain the information about the electronic devices at a periphery of the vehicle communication system 300 from each of the electronic devices or may indirectly obtain information about one electronic device through another electronic device. The processor 310 may obtain the information about the electronic devices at a periphery of the vehicle communication system 300 through V2X communication. The processor 310 may use the obtained information to establish a Wi-Fi direct communication connection.

According to an embodiment of the present disclosure, the processor 310 may determine a candidate electronic device capable of becoming a target for the Wi-Fi direct communication connection. The processor 310 may determine an electronic device that needs the Wi-Fi direct communication connection.

The processor 310 may discover an electronic device connected through Wi-Fi direct communication and may connect to the electronic device. The electronic device connected through the Wi-Fi direct communication may be the same as or different from an electronic device that has been connected through V2X communication. Herein, the electronic device connected through Wi-Fi direct communication may be an electronic device located within the coverage area of the Wi-Fi direct communication. The electronic device connected through V2X communication may be located within the coverage area of the Wi-Fi direct communication or may be located out of the coverage area of the Wi-Fi direct communication.

According to an embodiment of the present disclosure, the processor 310 may generate Wi-Fi direct information for Wi-Fi direct communication or multi hop Wi-Fi direct communication. The processor 310 may relay the Wi-Fi direct communication between electronic devices for multi hop communication. The processor 310 may transmit the generated information through the communication circuit 320. The processor 310 may store the generated information in the memory 330. The processor 310 may perform handover between the V2X communication and the Wi-Fi direct communication.

According to an embodiment of the present disclosure, the processor 310 may output the received data through the output device 340. The processor 310 may visually display the received data on the output device 340. In addition to the described operation, the processor 310 may be configured to perform other operations.

The memory 330 may store the Wi-Fi direct information. The memory 330 may store the Wi-Fi direct information for each electronic device. The memory 330 may store a neighboring table. According to an embodiment of the present disclosure, the is neighboring table may include pieces of information according to a V2X communication protocol. The Wi-Fi direct information may be stored in the neighboring table. For example, the Wi-Fi direct information may include Wi-Fi direct connection information. The memory 330 may include an instruction set, information, etc. for performing an operation.

The output device 340 may display data under the control of the processor 310. The output device 340 may be embedded in a vehicle or may be implemented as a separate element. The output device 340 may be included in an electronic device including the processor 310, the communication circuit 320, and the memory 330, or may be implemented as a separate element. For example, the output device 340 may be a display.

Figure 4:
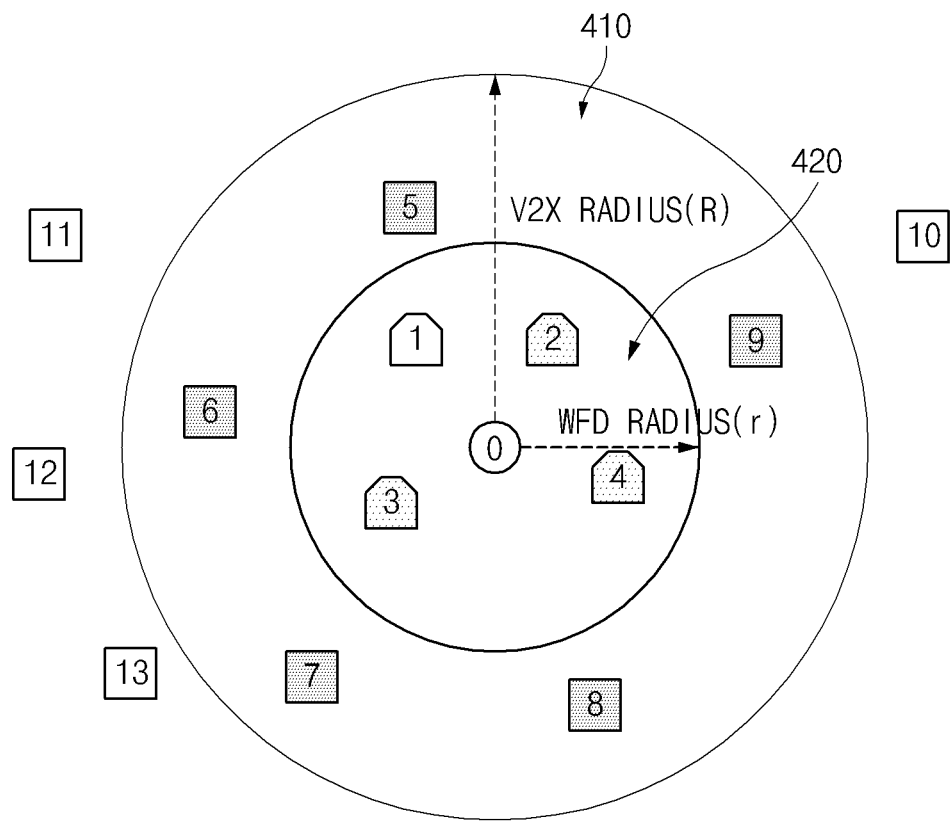
FIG. 4 illustrates a network environment of an electronic device, according to an embodiment of the present disclosure.

FIG. 4 illustrates a network environment of an electronic device, according to an embodiment of the present disclosure.

Hereinafter, a first electronic device may be an electronic device that receives data such as image information through a Wi-Fi direct connection, and a second electronic device may be an electronic device that transmits data through the Wi-Fi direct connection. The first electronic device may obtain Wi-Fi direct information during V2X communication and may use the obtained information for Wi-Fi direct communication connection. The first electronic device may obtain the Wi-Fi direct information in advance through V2X communication, etc., and may obtain high-capacity data by connecting quickly to the Wi-Fi direct communication as needed.

Referring to FIG. 4, index X indicates an electronic device X. For example, index 0 may be referred to as electronic device 0. As illustrated in FIG. 4, X may be a value from 0 to 13.

Hereinafter, an operation in which a first electronic device hands over from V2X communication to Wi-Fi direct communication will be described assuming that the electronic device 0 is the first electronic device. While performing the V2X is communication for the purpose of reliably receiving high-capacity data, the first electronic device may perform a handover to the Wi-Fi direct communication as needed.

The electronic device 0 may exchange and store the Wi-Fi direct information with neighboring devices in advance for the purpose of reducing a Wi-Fi direct connection time to a setup time in the microsecond range. The preliminary operation may be referred to as Wi-Fi direct provisioning.

According to an embodiment of the present disclosure, the electronic device may set a first area 410 and a second area 420 for the purpose of managing information about devices at a periphery of the electronic device. The first area 410 may be formed by the circle having the V2X first radius R with its origin placed at the location of electronic device 0. The second area 420 may be formed by the circle having the WFD second radius r with its origin placed at the location of electronic device 0. For example, electronic devices are discovered in the first area 410 that are capable of being connected to by Wi-Fi direct. The electronic device may store information about the discovered electronic devices in advance. The electronic device may manage electronic devices in the second area 420 as a candidate electronic device to establish a Wi-Fi direct connection.

According to various embodiments of the present disclosure, at least one of the first area 410 and the second area 420 may be referred to as a coverage area. For example, the first area 410 may be the V2X coverage area of the electronic device, and the second area 420 may be the Wi-Fi direct coverage area of the electronic device.

The Wi-Fi direct information may include the Wi-Fi direct connection information. The Wi-Fi direct connection information may include at least one of an Internet protocol (IP) address or a key. The Wi-Fi direct connection information may include at least one of Wi-Fi simple configuration information element (WSC IE) or peer to peer information element (P2P IE).

According to an embodiment of the present disclosure, the Wi-Fi direct information may be stored in the neighboring table. The neighboring table may be a table is including data associated with an electronic device, for example, a vehicle, according to a V2X communication protocol.

Table 1 illustrates an example of the neighboring table. The configuration of the neighboring table can change from the configuration illustrated in Table 1.

TABLE 1

| | Car Data | | | | | WFD Info. | |
|---|---|---|---|---|---|---|---|
| ID | location | speed | direction | ... | turn signal | Key | IP |
| 1 | xxx | xxx | xxx | ... | xxx | xxx | xxx |
| 2 | xxx | xxx | xxx | ... | xxx | xxx | xxx |
| 3 | xxx | xxx | xxx | ... | xxx | xxx | xxx |
| ... | ... | ... | ... | ... | ... | ... | ... |
| 9 | xxx | xxx | xxx | ... | xxx | xxx | xxx |

Referring to Table 1, the neighboring table may store vehicle data indicating the state of a vehicle such as a location, a speed, a direction, a turn signal, etc. for each electronic device. The neighboring table may store Wi-Fi direct information (WFD Info.) such as a key or an IP address for each electronic device. Each electronic device may have an identification (ID).

Referring back to FIG. 4, since the electronic devices 0 to 9 are present in the first area 410, the neighboring table associated with the electronic device 0 may store information about an electronic device corresponding to each of the IDs 1 to 9.

Figure 5:
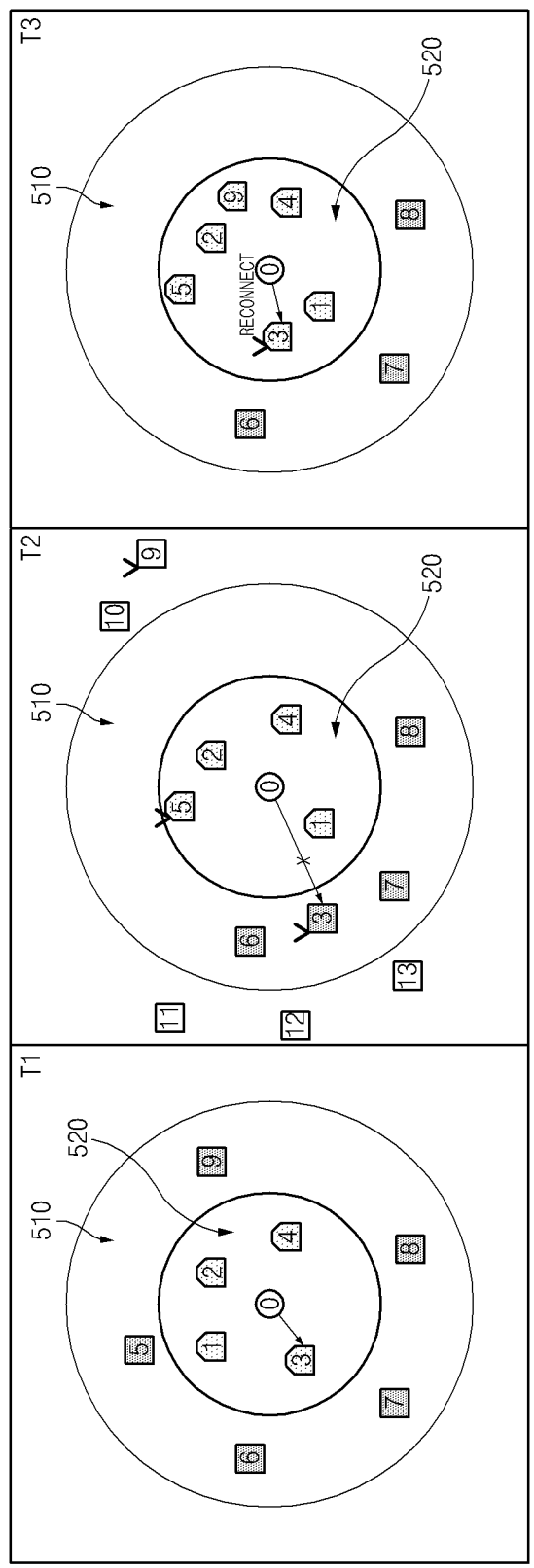
FIG. 5 illustrates an operation in which an electronic device manages information over time, according to an embodiment of the present disclosure.

FIG. 5 illustrates an operation in which an electronic device manages information as time passes, according to an embodiment of the present disclosure.

Referring to FIG. 5, index X indicates an electronic device X. For example, index 0 may be referred to as an electronic device 0. The first area 510 may be formed by the circle having the first radius R with its origin placed at the location of electronic device 0. The second area 520 may be formed by the circle having the second radius r with the its origin placed at the location of electronic device 0.

The electronic device 0 may determine reachability based on a distance to a neighboring device. In the case where there is reachability by Wi-Fi direct is communication to the neighboring device, the electronic device 0 may set the corresponding neighboring device to a candidate device connectable by Wi-Fi direct. Referring back to FIG. 4, electronic devices located within a second area 420 have reachability on the basis of the electronic device 0. A neighboring table may further include reachability information. The reachability information may be displayed with respect to electronic devices within a first area 410.

Table 2 illustrates the neighboring table including the reachability information.

TABLE 2

| | Car Data | | | | | | |
|---|---|---|---|---|---|---|---|
| | | | | | | WFD Info. | |
| ID | location | speed | direction | ... | turn signal | Key | IP | Reachability |
| 1 | xxx | xxx | xxx | ... | xxx | xxx | xxx | O |
| 2 | xxx | xxx | xxx | ... | xxx | xxx | xxx | O |
| 3 | xxx | xxx | xxx | ... | xxx | xxx | xxx | O |
| 4 | xxx | xxx | xxx | ... | xxx | xxx | xxx | O |
| ... | ... | ... | ... | ... | ... | ... | ... | ... |
| 9 | xxx | xxx | xxx | ... | xxx | xxx | xxx | X |

Referring back to FIG. 5, at time T1, electronic devices 1 to 4 may have the reachability from the electronic device 0. The reachability field of Table 2 may store a value indicating that the electronic devices 1 to 4 have reachability. A value indicating that there is no reachability may be stored in the reachability field associated with electronic devices 5 to 9, which are not located in the second area 520.

In the case where the electronic device 0 needs to connect by Wi-Fi direct to the electronic device 3, the electronic device 0 may determine that the electronic device 3 has reachability and may connect by Wi-Fi direct to the electronic device 3 by using the Wi-Fi direct information.

Electronic devices within the first area 510 and the second area 520 may change with time. At time T2, the electronic device 5 may first enter the second area 520, and the electronic device 3 may move out of the second area 520. The electronic device 9 may move to the outside of the first area 510. Electronic devices 9 to 13 may be present in the outside of the first area 510.

The electronic device 0 may update a reachability field value associated with the electronic device 3 in the neighboring table. The electronic device 0 may change a reachability field from a value indicating existence to a value indicating nonexistence with respect to the electronic device 3. The electronic device 0 may update the reachability field value associated with the electronic device 5 in the neighboring table. The electronic device 0 may change the reachability field from a value indicating nonexistence to a value indicating existence with respect to the electronic device 5.

The electronic device 0 may store or maintain information of electronic devices located within the first area 510 in the neighboring table. The electronic device 0 may not store information of electronic devices located outside of the first area 510 in the neighboring table. Depending on the location of the electronic device 9 at time T2, the electronic device 0 may delete data stored with respect to the electronic device 9 in the neighboring table. According to an embodiment of the present disclosure, the electronic device 0 may delete only the reachability information of the electronic device 9.

At time T3, the electronic device 0 may determine that the electronic device 3 and the electronic device 9 are located within the second area 520. The electronic device 0 may change the reachability field value of the electronic device 3. In the case where there is a need for a Wi-Fi direct connection to the electronic device 3, the electronic device 0 may try to reconnect to the electronic device 3. The electronic device 0 may use the information stored in the neighboring table.

The electronic device 0 may add information about the electronic device 9 to the neighboring table. According to an embodiment of the present disclosure, the electronic device 0 may add reachability information about the electronic device 9 to the neighboring table again.

According to an embodiment of the present disclosure, while performing V2X communication, an electronic device may store, in advance, information about an electronic device capable of connecting to the Wi-Fi direct network and may manage a Wi-Fi direct candidate device by using the reachability information, thereby reducing disconnection due to frequent movements.

According to an embodiment of the present disclosure, the size of the second area 520 for determining the reachability may be changed depending on a communication environment. The electronic device may change the size of the second area 520 or the size of a second radius r being the Wi-Fi direct radius, based on vehicle data of Table 1, Table 2, and/or how many vehicles are concentrated in the area around electronic device 0. In the case where vehicles are highly concentrated in the first area 510 or the second area 520, the electronic device may decrease or increase the size of the second area 520 depending on the vehicle data. Alternatively, the electronic device may decrease or increase the size of the second radius r.

Hereinafter, the radius of the V2X communication for determining the reachability may be referred to as a first threshold, and the Wi-Fi direct radius may be referred to as a threshold or second threshold.

Figure 6:
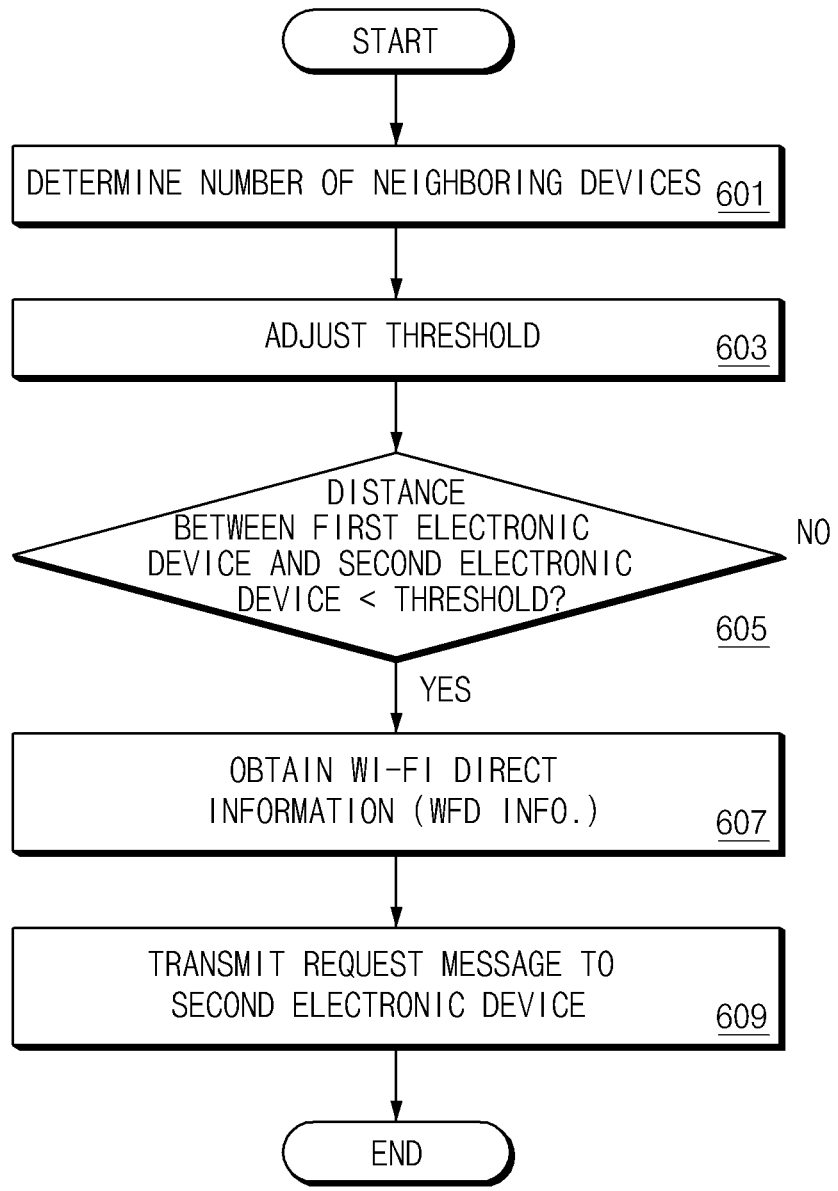
FIG. 6 is a flowchart of an operation of an electronic device, according to an embodiment of the present disclosure.

Though the first area 510 and second area 520 are illustrated as a circle, any shape is within the scope of the present disclosure. FIG. 6 is a flowchart of an operation of an electronic device, according to an embodiment of the present disclosure.

Referring to FIG. 6, a first electronic device 200 may perform V2X communication. The first electronic device 200 may adjust a threshold for determining reachability depending on the concentration of devices located at a periphery of the first electronic device 200 and may connect to the second electronic device 201 based on the reachability.

In step 601, the first electronic device 200 may determine the number of neighboring devices located at a periphery of the first electronic device 200. The first electronic device 200 may obtain the number of neighboring devices based on V2X is communication. The number of neighboring devices may be determined by using vehicle data stored in a neighboring table. According to an embodiment of the present disclosure, the number of neighboring devices may be the number of neighboring devices within a second area or within a second radius. The number of neighboring devices may be the number of neighboring devices within a first area or within a first radius.

In step 603, the first electronic device 200 may adjust a threshold. The first electronic device 200 may adjust the threshold based on the number of neighboring devices. In the case where the number of neighboring devices is large, the first electronic device 200 may decrease the threshold. In the case where the number of neighboring devices is small, the first electronic device 200 may increase the threshold.

In step 605, the first electronic device 200 may determine the reachability of a second electronic device 201. The first electronic device 200 may calculate a distance between the first electronic device 200 and the second electronic device 201. The first electronic device 200 may determine whether the distance to the second electronic device 201 satisfies the threshold. According to an embodiment of the present disclosure, in the case where the distance to the second electronic device 201 is less than the threshold, the first electronic device 200 may determine that the distance satisfies the threshold. If the distance to the second electronic device 201 does not satisfy the threshold, the first electronic device 200 may end the operation.

If the distance to the second electronic device 201 satisfies the threshold, in step 607, the first electronic device 200 may obtain Wi-Fi direct information. The first electronic device 200 may obtain the Wi-Fi direct information stored in a memory 230. The Wi-Fi direct information may include Wi-Fi direct information about the second electronic device 201.

Figure 7A:
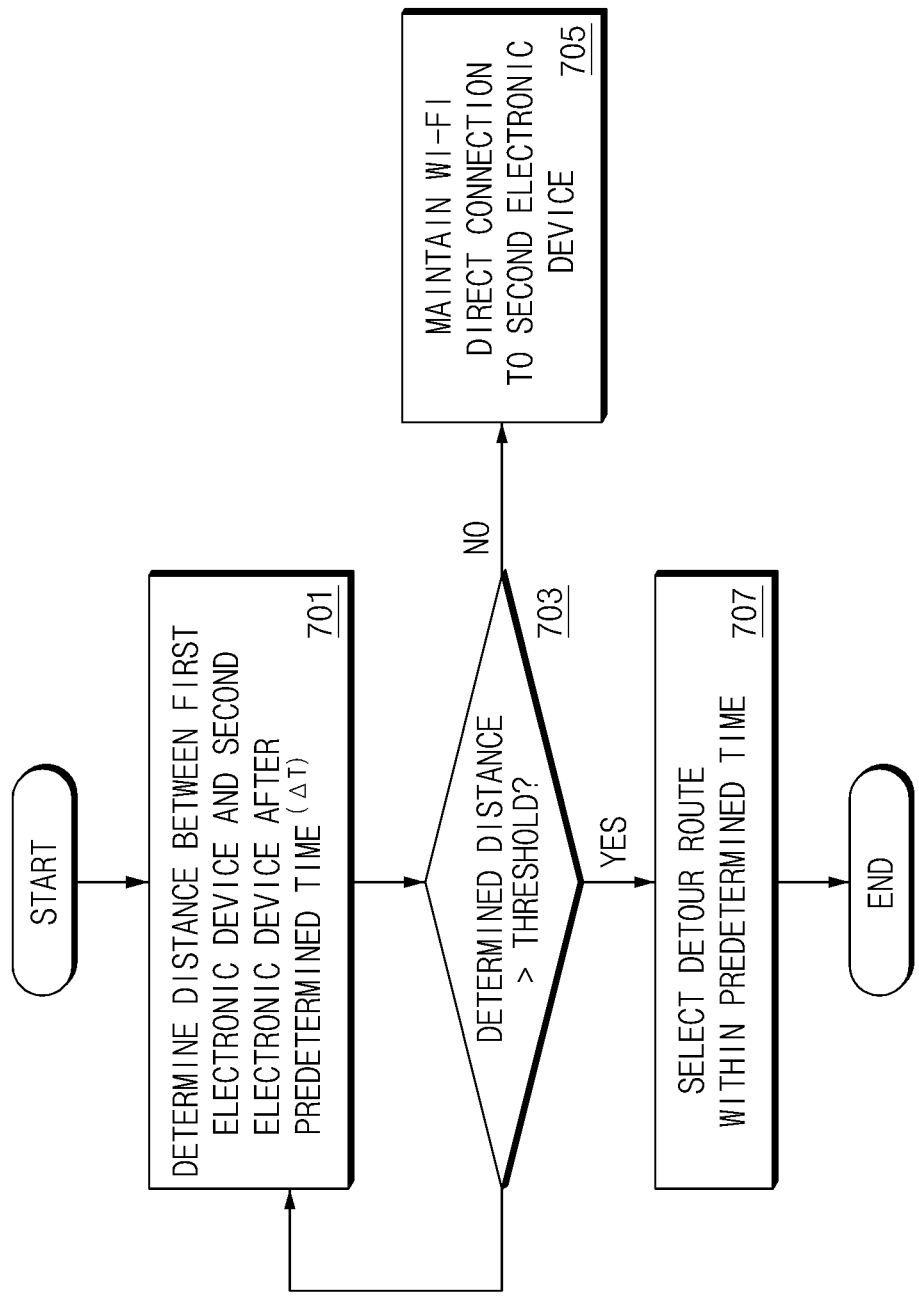
FIG. 7A is a flowchart of an operation of an electronic device, according to an embodiment of the present disclosure.
Figure 7B:
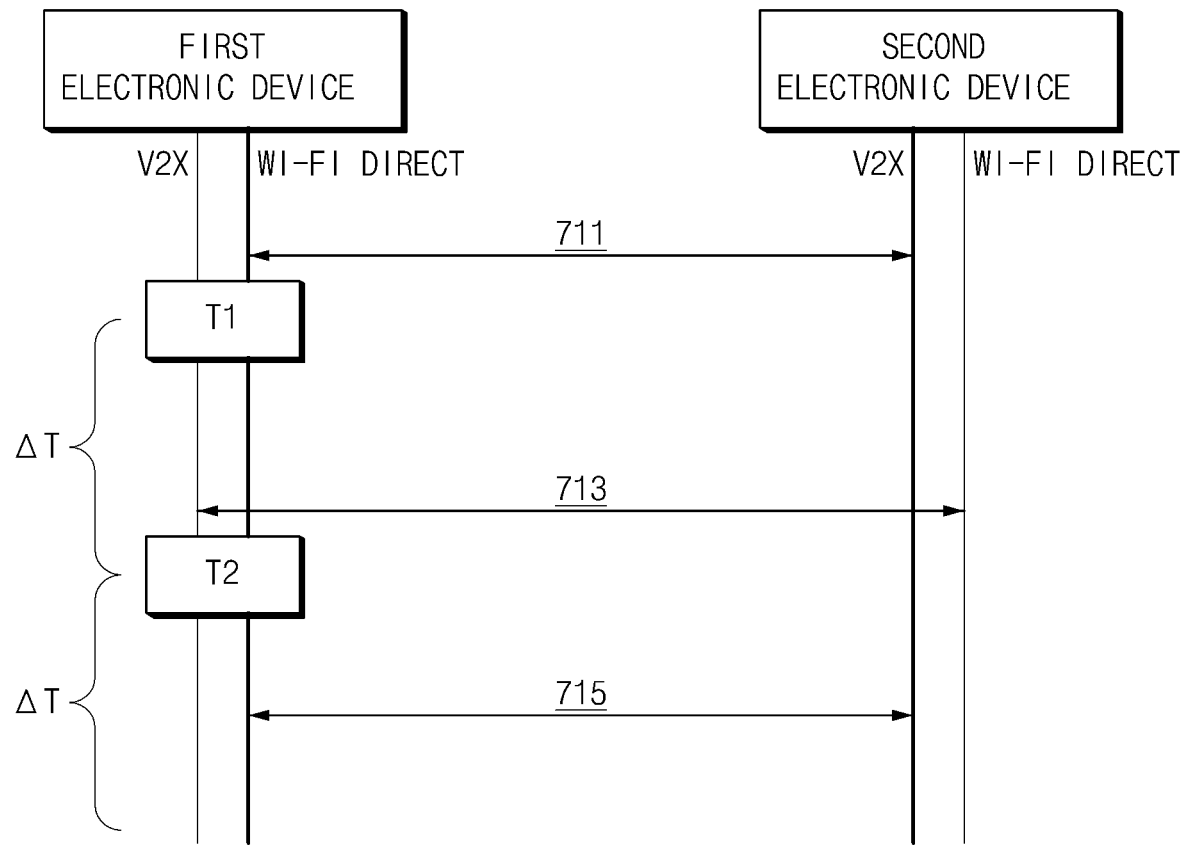
FIG. 7B is a flowchart of an operation of an electronic device as time passes, according to an embodiment of the present disclosure.

The first electronic device 200 may perform Wi-Fi direct communication with the second electronic device 201 by using the Wi-Fi direct information. In step 609, the first electronic device 200 may transmit a request message to the second electronic device 201. According to an embodiment of the present disclosure, the first electronic device 200 may generate the request message based on the Wi-Fi direct information. The first electronic device 200 may generate the request message including the Wi-Fi direct information. The request message may be a data request message (or a video stream request message) for requesting data transfer or a connection request message for requesting a Wi-Fi direct communication connection. FIG. 7A is a flowchart of an operation of an electronic device, according to an embodiment of the present disclosure. FIG. 7B is a flowchart of an operation of an electronic device over time, according to an embodiment of the present disclosure.

Referring to FIG. 7A, the first electronic device 200 may perform Wi-Fi direct communication with a second electronic device 201. The first electronic device 200 may predict whether the connection between the first electronic device 200 and the second electronic device 201 is disconnected after a predetermined time by using the speed of an electronic device. In the case where it is predicted that the connection is to be disconnected, the first electronic device 200 may provide notification that the connection is disconnected before the termination of a current communication service, and may connect to a heterogeneous communication (e.g., V2X communication) network.

In step 701, the first electronic device 200 may determine a distance between the second electronic device 201 and the first electronic device 200 after a predetermined time ΔT has elapsed. The first electronic device 200 may determine the distance between the second electronic device 201 and the first electronic device 200 after a predetermined time based on the current speed of each of electronic devices.

$$x+V_R\times\Delta T-V_H\times\Delta T \quad (1)$$

In Equation (1), x denotes the distance between the first electronic device 200 and the second electronic device 201, at a specific time point. $V_R$ denotes the speed of the second electronic device 201. $V_H$ denotes the speed of the first electronic device 200. Referring to Equation (1), the first electronic device 200 may determine the distance between the second electronic device 201 and the first electronic device 200 after a predetermined time ΔT has elapsed based on a difference value between a movement distance of the second electronic device 201 during the predetermined time ΔT and a movement distance of the first electronic device 200 during the predetermined time ΔT.

In step 703, the first electronic device 200 may determine whether the determined distance satisfies a threshold. According to an embodiment of the present disclosure, the first electronic device 200 may determine whether the determined distance is greater than the threshold. The threshold may be a second threshold for determining whether the second electronic device 201 is in a second area.

If the determined distance does not satisfy the threshold, in step 705, the first electronic device 200 may maintain the Wi-Fi direct communication connection to the second electronic device 201.

If the determined distance satisfies the threshold, in step 707, the first electronic device 200 may select a detour route to receive data within the predetermined time without disconnection. For example, the first electronic device 200 may perform a handover to the V2X communication and may receive data from the second electronic device 201. In terms of a data rate, the first electronic device 200 may receive high-definition data through Wi-Fi communication, and then may receive low-definition data or supplementary data through V2X communication.

Referring to FIG. 7B, in step 711, the first electronic device 200 may transmit high-definition data to the second electronic device 201 through Wi-Fi direct communication or may receive the high-definition data from the second electronic device 201 through Wi-Fi direct communication.

At time T1, the first electronic device 200 may determine the connection state between the first electronic device 200 and the second electronic device 201 after the predetermined time ΔT. In step 713, the first electronic device 200 may predict that the connection to the second electronic device 201 is to be disconnected at time T2, and may connect by V2X communication before reaching time T2. The first electronic device 200 may perform the handover through V2X communication before reaching time T2. If performing V2X communication, the first electronic device 200 may transmit low-definition data or supplementary data to the second electronic device 201, or may receive the low-definition data or the supplementary data from the second electronic device 201.

In step 715, after time T2, if the distance between the first electronic device 200 and the second electronic device 201 satisfies a threshold, the first electronic device 200 may establish a Wi-Fi direct communication connection again. The first electronic device 200 may transmit or receive high-definition data to or from the second electronic device 201 through Wi-Fi direct communication.

Figure 8:
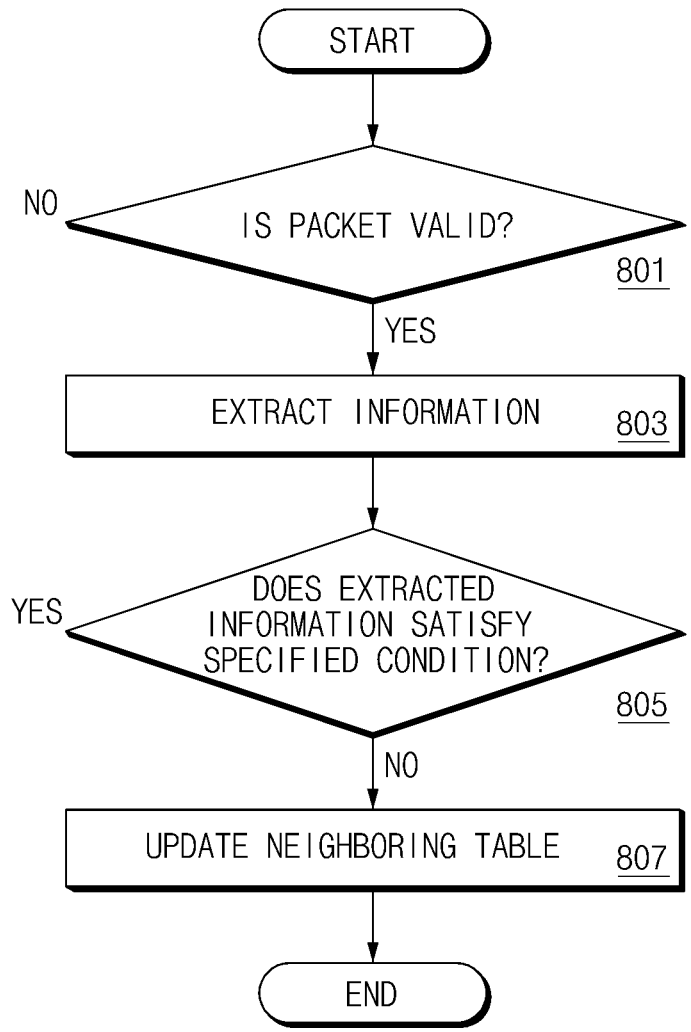
FIG. 8 is a flowchart of an operation in which an electronic device updates Wi-Fi direct information, according to an embodiment of the present disclosure.

FIG. 8 is a flowchart of an operation in which an electronic device updates Wi-Fi direct information, according to an embodiment of the present disclosure.

Referring to FIG. 8, in step 801, a first electronic device 200 may determine whether a packet is valid. In the case where the packet is not valid, the first electronic device 200 may end the operation.

In the case where the packet is valid, in step 803, the first electronic device 200 may extract information about a neighboring device. The first electronic device 200 may obtain the information about the neighboring device. The information about the neighboring device may include Wi-Fi direct information of the neighboring device. According to an embodiment of the present disclosure, the information about the neighboring device may further include vehicle information of the neighboring device. For example, the vehicle information of the neighboring device may include at least one of location information or vehicle data (e.g., width, height, etc.) of the neighboring device.

In step 805, the first electronic device 200 may determine whether the extracted information satisfies a specified condition. The specified condition may include the case where the extracted information is duplicate information and/or the case where the extracted information is outdated information. If the extracted information satisfies the specified condition, the first electronic device 200 may not update the extracted information and may end the operation.

If the extracted information does not satisfy the specified condition, in step 807, the first electronic device 200 may update the neighboring table. The first electronic device 200 may store the extracted information. According to an embodiment of the present disclosure, in the case where the extracted information is not the outdated information and is not the duplicate information, the first electronic device 200 may store the extracted information.

The operations of steps 801 to 807 are described as being performed by the first electronic device 200. However, the second electronic device 201 may perform the operations of steps 801 to 807.

Figure 9:
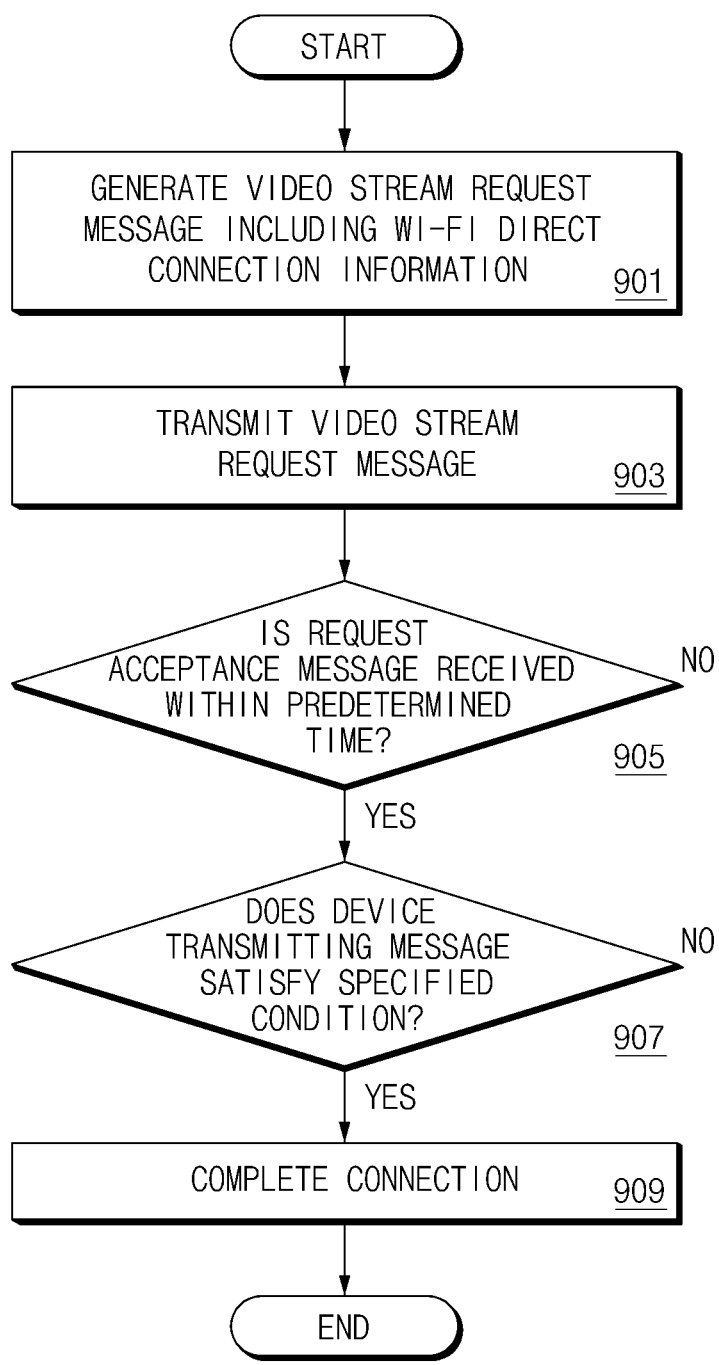
FIG. 9 is a flowchart of an operation of an electronic device performing Wi-Fi direct communication, according to an embodiment of the present disclosure.

FIG. 9 is a flowchart of an operation of an electronic device performing Wi-Fi direct communication, according to an embodiment of the present disclosure.

Referring to FIG. 9, a first electronic device 200 may transmit a video stream request message to a second electronic device 201 and may establish a Wi-Fi direct communication connection.

In step 901, the first electronic device 200 may generate the video stream request message. According to an embodiment of the present disclosure, the video stream request message may include Wi-Fi direct connection information. The Wi-Fi direct connection information may include at least one of WSC IE and P2P IE.

In step 903, the first electronic device 200 may transmit the video stream request message to the second electronic device 201.

In step 905, the first electronic device 200 may determine whether a request acceptance message is received from the second electronic device 201 within a predetermined time. In the case where the request acceptance message is not received within the predetermined time, the first electronic device 200 may not establish a Wi-Fi direct connection and end the operation.

The request acceptance message may be a message for accepting a video stream request. According to an embodiment of the present disclosure, the request acceptance message may mean that a Wi-Fi connection request is accepted. In the case where the second electronic device 201 receives the video stream request message including the Wi-Fi direct information, the second electronic device 201 may determine that the first electronic device 200 requests a Wi-Fi direct connection.

If receiving a request message within the predetermined time, in step 907, the first electronic device 200 may determine whether the corresponding message satisfies a specified condition. According to an embodiment of the present disclosure, the first electronic device 200 may determine whether the second electronic device 201 transmitting a connection request message satisfies the specified condition. The first electronic device 200 may determine whether the second electronic device 201 is an electronic device located in front of the first electronic device 200. In the case where the second electronic device 201 does not satisfy the specified condition (e.g., in the case where the second electronic device 201 is not an electronic device located in front of the first electronic device 200), the first electronic device 200 may not establish a Wi-Fi direct connection and may end the operation.

In the case where the second electronic device 201 satisfies the specified condition (e.g., in the case where the second electronic device 201 is an electronic device located in front of the first electronic device 200), in step 909, the first electronic device 200 may establish a Wi-Fi direct connection to the second electronic device 201.

A part of operations of steps 901 to 909 may be skipped, additional steps may be added, or steps may be changed. In the case where the second electronic device 201 accepts the request of the first electronic device 200, the second electronic device 201 may transmit a video stream to the first electronic device 200 together with a connection acceptance message. The first electronic device 200 may receive the video stream together with the connection acceptance message as a response message associated with the video stream request message.

Figure 10:
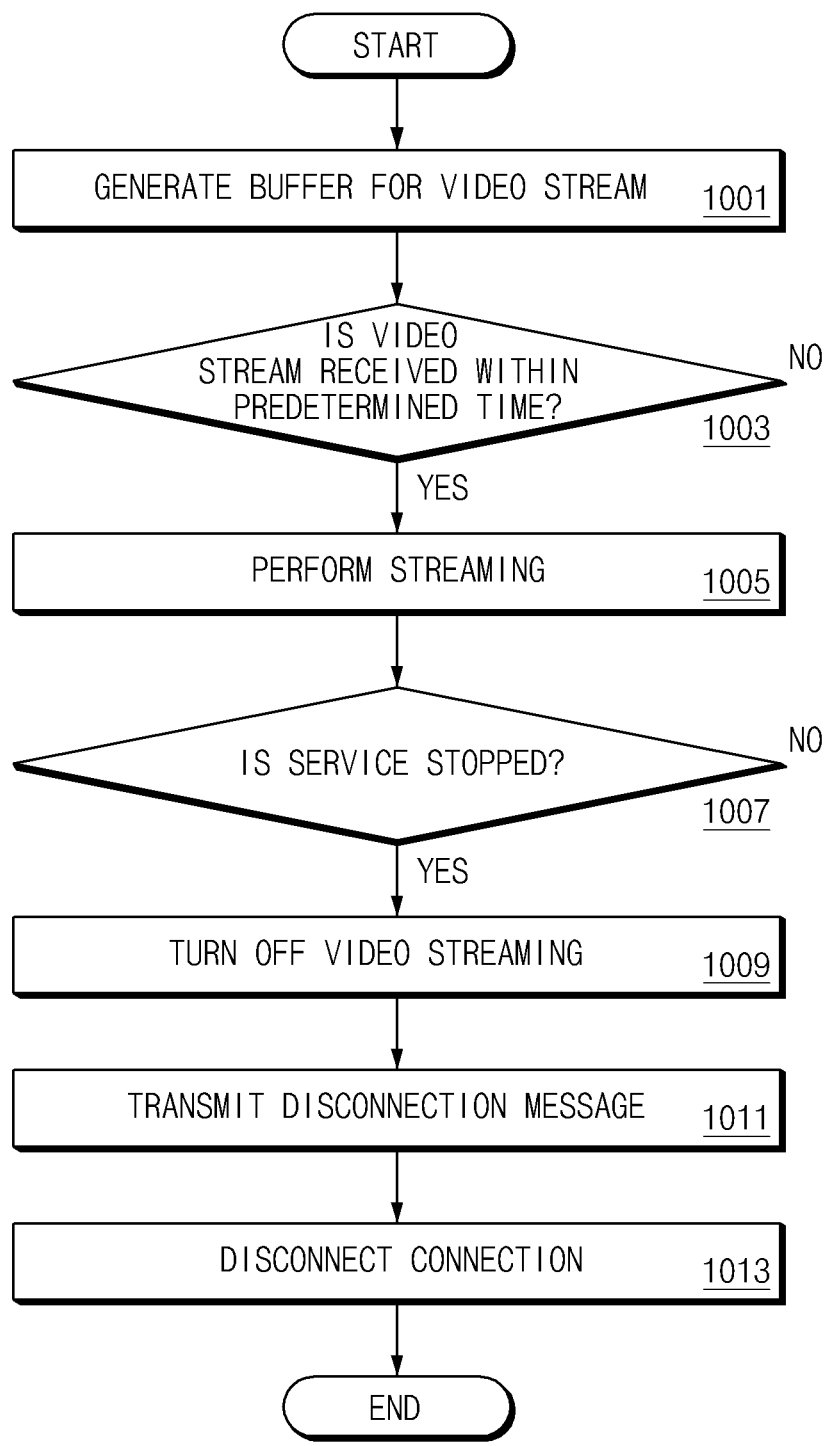
FIG. 10 is a flowchart of an operation in which an electronic device receives data by using Wi-Fi direct communication, according to an embodiment of the present disclosure.

FIG. 10 is a flowchart of an operation in which an electronic device receives data by using Wi-Fi direct communication, according to an embodiment of the present disclosure.

A first electronic device 200 may receive high-capacity data (e.g., a video stream) through Wi-Fi direct communication. An operation described below may be performed after steps 901 to 909.

Referring to FIG. 10, in step 1001, the first electronic device 200 may generate a buffer for a video stream. According to an embodiment of the present disclosure, the first electronic device 200 may generate the buffer for the video stream after transmitting the video stream request message.

In step 1003, the first electronic device 200 may determine whether the video stream is transmitted within a predetermined time. If the video stream is not transmitted within the predetermined time, the first electronic device 200 may end the reception of the video stream and end the operation.

If the video stream is transmitted within the predetermined time, in step 1005, the first electronic device 200 may perform streaming The first electronic device 200 may receive the video stream and may perform the streaming The first electronic device 200 may provide a streaming service through an output device.

The case where the streaming service is stopped while the first electronic device 200 provides the streaming service may occur. In the case where the service is stopped, the first electronic device 200 may disconnect the connection to the second electronic device 201.

In step 1007, the first electronic device 200 may determine whether the streaming service is stopped or the streaming service will be stopped. According to an embodiment of the present disclosure, the first electronic device 200 may monitor whether a situation in which the streaming service is stopped occurs. For example, in the case where the first electronic device 200 receives a user request through an input device, the first electronic device 200 may stop the service. In the case where the video stream is not transmitted due to the emergency of the second electronic device 201, it may be determined that the service is stopped. If the service is not stopped, step 1005 is repeated.

In the case where it is determined that the service is stopped, in step 1009, the first electronic device 200 may turn off the video streaming In step 1011, the first electronic device 200 may transmit a disconnection message for disconnecting the Wi-Fi direct connection to the second electronic device 201. In step 1013, the first electronic device 200 may disconnect the Wi-Fi direct connection.

Figure 11:
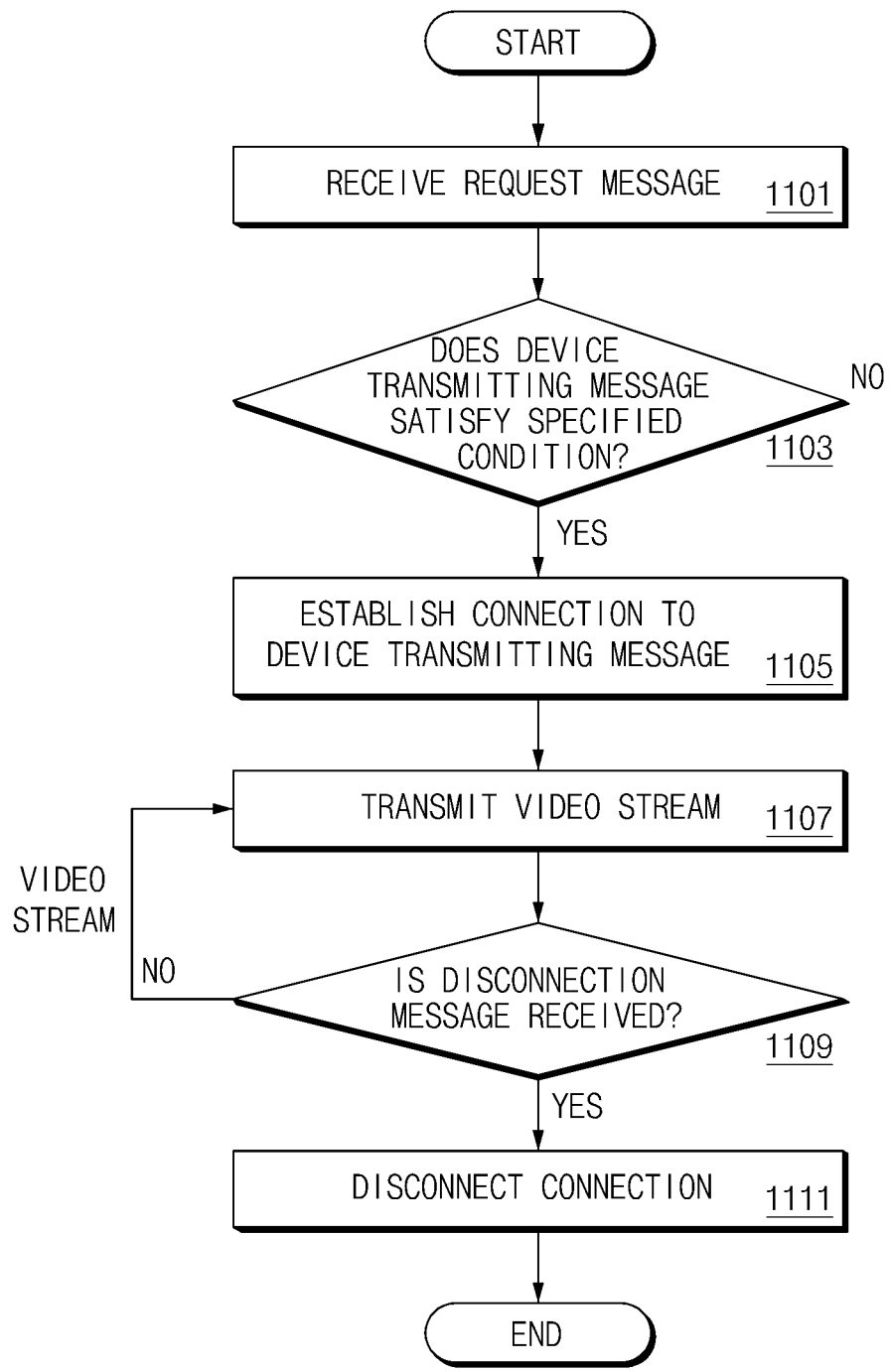
FIG. 11 is a flowchart of an operation in which an electronic device transmits data, according to an embodiment of the present disclosure.

FIG. 11 is a flowchart of an operation in which an electronic device transmits data, according to an embodiment of the present disclosure.

A second electronic device 201 may transmit high-capacity data (e.g., a video stream) to a first electronic device 200 through Wi-Fi direct communication. At the start, it may be assumed that the second electronic device 201 performs communication in a V2X environment. Hereinafter, the operation of the second electronic device 201 will be described with reference to the case where the high-capacity data is the video stream.

In step 1101, the second electronic device 201 may receive a request message. According to an embodiment of the present disclosure, the second electronic device 201 may receive the request message from the first electronic device 200. The request message may be a unicast message. The request message may be a connection request message for requesting a Wi-Fi direct connection and/or a video stream request message. In the case where the second electronic device 201 receives the connection request message, the second electronic device 201 may determine whether there is a video stream request. In the case where the second electronic device 201 receives the video stream request message, the second electronic device 201 may determine whether there is a connection request.

In step 1103, the second electronic device 201 may determine whether the request message satisfies a specified condition. The second electronic device 201 may determine whether the first electronic device 200 transmitting the request message satisfies the specified condition. According to an embodiment of the present disclosure, the second electronic device 201 may determine whether the first electronic device 200 is an electronic device located behind the second electronic device 201. In the case where the first electronic device 200 does not satisfy the specified condition, the second electronic device 201 may not establish a Wi-Fi direct communication connection to the first electronic device 200 and the operation may end.

In the case where the first electronic device 200 transmitting the request message satisfies the specified condition, in step 1105, the second electronic device 201 may establish a Wi-Fi direct communication connection to the first electronic device 200 transmitting the message. The second electronic device 201 may establish a Wi-Fi direct communication connection to the first electronic device 200. In step 1107, the second electronic device 201 may transmit a video stream to the first electronic device 200. According to an embodiment of the present disclosure, the second electronic device 201 may photograph the surroundings and may transmit the video stream generated based on the photographed image to the first electronic device 200.

The situation in which the first electronic device 200 needs to stop the video streaming while the second electronic device 201 is transmitting the video stream may occur. Hereinafter, the operation of the second electronic device 201 associated with the stop of the video streaming will be described.

In step 1109, the second electronic device 201 may determine whether a disconnection message is received. In the case where the second electronic device 201 does not receive the disconnection message, the second electronic device 201 may maintain step 1107. The second electronic device 201 may continue to transmit the video stream.

If receiving the disconnection message, in step 1111, the second electronic device 201 may disconnect the Wi-Fi direct connection to the first electronic device 200.

Figure 12A:
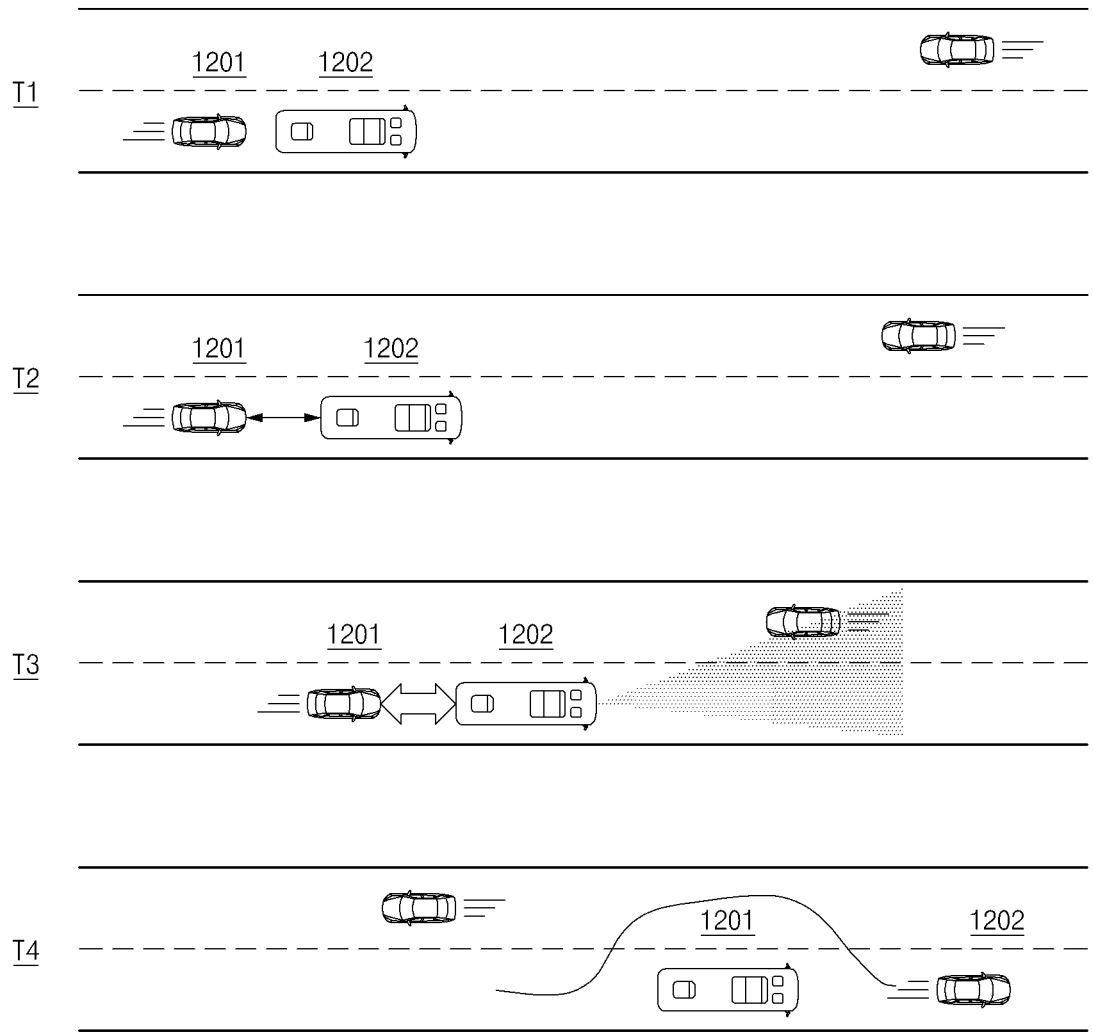
FIG. 12A illustrates a scenario applied to an electronic device, according to an embodiment of the present disclosure.
Figure 12B:
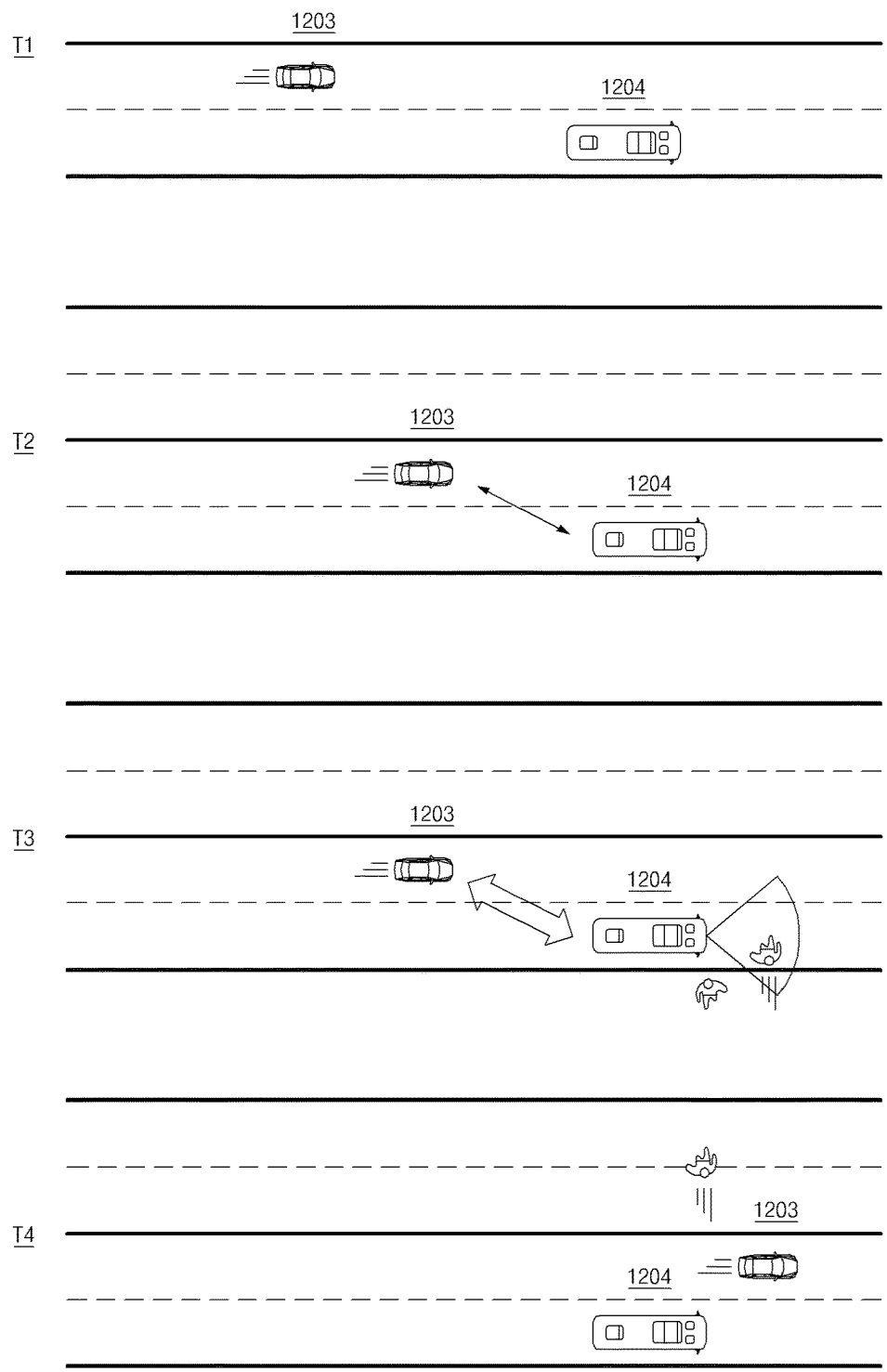
FIG. 12B illustrates a scenario applied to an electronic device, according to an embodiment of the present disclosure.
Figure 12C:
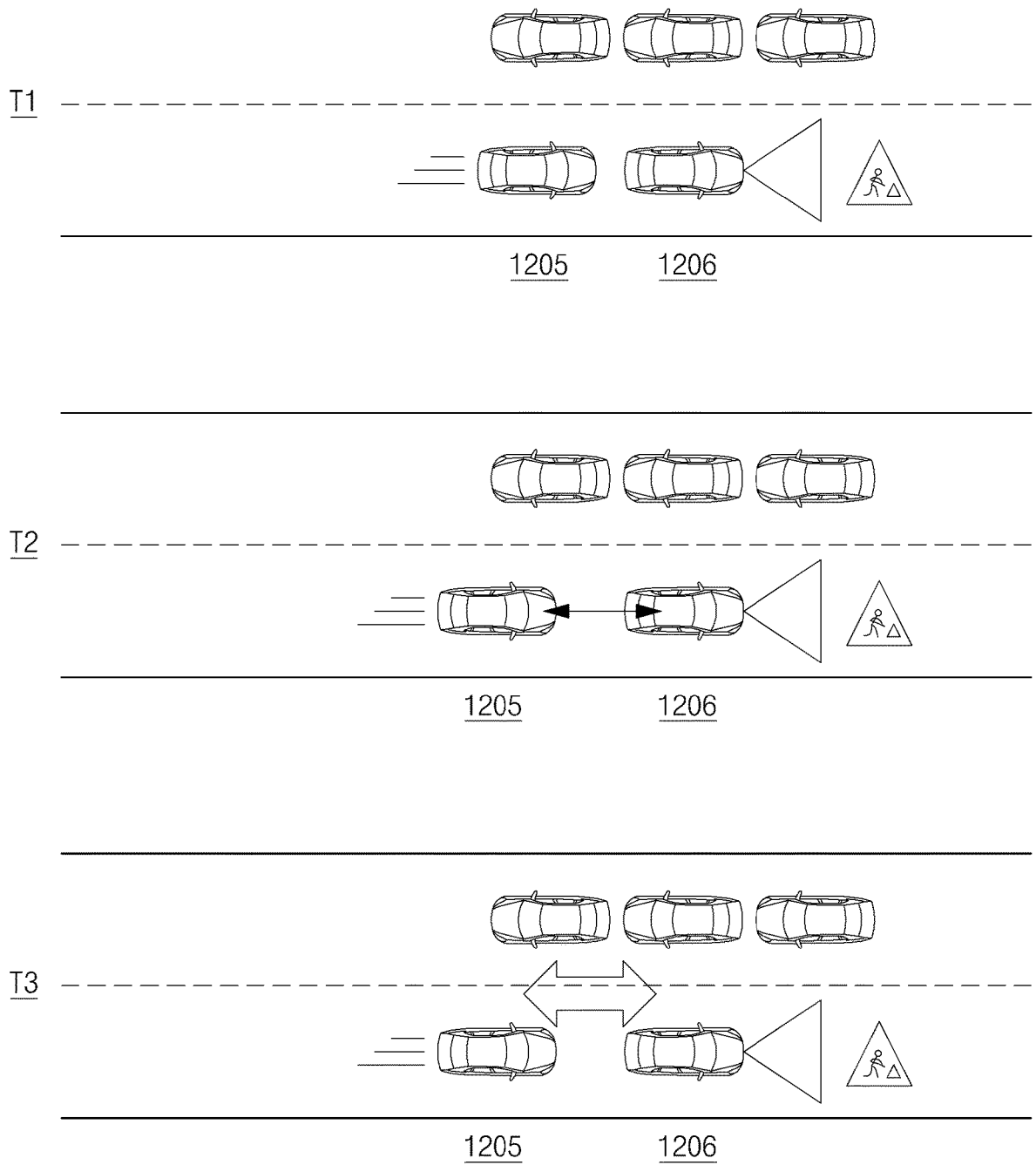
FIG. 12C illustrates a scenario applied to an electronic device, according to an embodiment of the present disclosure.

FIGS. 12A to 12C illustrate various scenarios applied to an electronic device, according to various embodiments of the present disclosure. In particular, various scenarios required by Wi-Fi direct communication are illustrated.

Referring to FIG. 12A, the case where a first electronic device 1201 passes a second electronic device 1202, the operations of the first electronic device 1201 and the second electronic device 1202 will be described.

At time T1, the first electronic device 1201 may determine to trigger a Wi-Fi direct communication service. The first electronic device 1201 may determine a passing time when the first electronic device 1201 passes the second electronic device 1202. The first electronic device 1201 may determine the passing time based on at least one of information about the turn signal lighting, information about a front low-speed vehicle, and information about the second electronic device 1202. The first electronic device 1201 may determine the passing time by analyzing the pieces of information.

At time T2, the first electronic device 1201 may request sensing data (e.g., a video stream) through V2X communication or DSRC.

At time T3, the first electronic device 1201 and the second electronic device 1202 may establish a Wi-Fi direct communication connection. The first electronic device 1201 may receive a video stream from the second electronic device 1202 through Wi-Fi direct communication. The first electronic device 1201 may perform video streaming The second electronic device 1202 may use a sensing device to obtain the sensing data in response to a data request from the first electronic device 1201. The second electronic device 1202 may transmit the obtained sensing data to the first electronic device 1201 through Wi-Fi direct communication.

At time T4, the first electronic device 1201 may stop streaming The first electronic device 1201 may pass the second electronic device 1202 after stopping the streaming, or may stop the streaming while passing the second electronic device 1202.

Referring to FIG. 12b, in the case where a first electronic device 1203 approaches a second electronic device 1204 that is stopped on the road, the operations of the first electronic device 1203 and the second electronic device 1204 will be described.

At time T1, the first electronic device 1203 may determine if a Wi-Fi direct communication service is triggered. The first electronic device 1203 may sense the second electronic device 1204 is stopped on the road close to a lane in which the first electronic device 1203 is driving. The first electronic device 1203 may determine whether the second electronic device 1204 is stopped on the road based on information about a location, a lane, a speed, and/or a brake.

At time T2, the first electronic device 1203 may make a request for the video stream to the second electronic device 1204 through V2X communication or DSRC.

At time T3, the first electronic device 1203 and the second electronic device 1204 may perform Wi-Fi direct communication. The first electronic device 1203 may receive the video stream from the second electronic device 1204 through Wi-Fi direct communication. The first electronic device 1203 may perform video streaming The second electronic device 1204 may transmit the video stream to the first electronic device 1203 through Wi-Fi direct communication.

At time T4, the first electronic device 1203 may stop streaming. For example, in the case where the first electronic device 1203 passes the second electronic device 1204, the first electronic device 1203 may stop the streaming In the case where the first electronic device 1203 obtains a request from a user (e.g., a driver) of the first electronic device 1203, the first electronic device 1203 may stop the streaming.

Referring to FIG. 12C, in the case where a first electronic device 1205 approaches a second electronic device 1206 that has suddenly stopped, the operations of the first electronic device 1205 and the second electronic device 1206 will be described.

At time T1, the first electronic device 1205 may determine if Wi-Fi direct communication is triggered. The first electronic device 1205 may determine whether the second electronic device 1206 located in front of the first electronic device 1205 has used an emergency brake or another method to suddenly stop. The first electronic device 1205 may determine whether the second electronic device 1206 has suddenly stopped based on information about a location, a driving speed, and/or a brake.

At time T2, the first electronic device 1205 may make a request for the video stream to the second electronic device 1206 through V2X communication or DSRC.

At time T3, the first electronic device 1205 and the second electronic device 1206 may establish a Wi-Fi direct communication connection. The first electronic device 1205 may receive the video stream from the second electronic device 1206 through Wi-Fi direct communication. The first electronic device 1205 may perform video streaming The second electronic device 1206 may transmit the video stream to the first electronic device 1203 through Wi-Fi direct communication.

The first electronic device 1205 may stop the streaming. For example, in the case where there is a request of a driver of the first electronic device 1205, the first electronic device 1205 may stop the streaming Various scenarios may be applied to embodiments of the present disclosure in addition to the scenarios of FIGS. 12A to 12C.

Figure 13:
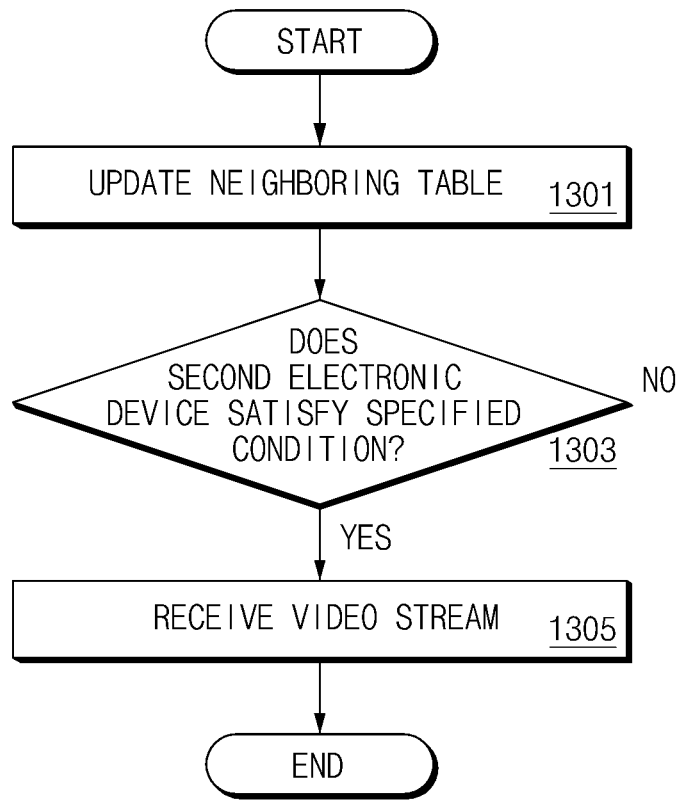
FIG. 13 is a flowchart of an operation of an electronic device that determines various scenarios, according to an embodiment of the present disclosure.

FIG. 13 is a flowchart of an operation of an electronic device that determines various scenarios, according to an embodiment of the present disclosure.

Referring to FIG. 13, in step 1301, a first electronic device 200 may update a neighboring table. The first electronic device 200 may periodically update the neighboring table. The first electronic device 200 may update the neighboring table based on V2X communication.

In step 1303, the first electronic device 200 may determine whether the second electronic device 201 satisfies a specified condition. The first electronic device 200 may obtain information about the second electronic device 201 from various electronic devices. The specified condition may include a condition to be described below.

Step 1303 will be described depending on a scenario of passing, stopping on the road, or suddenly stopping.

According to an embodiment of the present disclosure, the first electronic device 200 may determine whether a turn signal is turned on. In the case where the turn signal is turned on, the first electronic device 200 may determine whether passing occurs. Whether passing occurs may be determined based on at least one of a lane of the second electronic device 201, whether the second electronic device 201 is a device in front of the first electronic device 200, a speed of the second electronic device 201, a speed of the first is electronic device 200, location information of the second electronic device 201, turn signal state information of the second electronic device 201, or brake information of the second electronic device 201.

In the case where the first electronic device 200 determines that the passing occurs, the first electronic device 200 may determine that the second electronic device 201 satisfies the specified condition.

According to an embodiment of the present disclosure, the first electronic device 200 may determine whether the second electronic device 201 has stopped on the road. Whether the second electronic device 201 has stopped on the road may be determined based on whether the speed of the second electronic device 201 is approximately zero, whether the direction of the first electronic device 200 is the same as the direction of the second electronic device 201, whether a lane of the second electronic device 201 is the last lane, and/or whether the first electronic device 200 and the second electronic device 201 are located within a predetermined distance. In the case where the first electronic device 200 determines that the second electronic device 201 is stopped at the roadside, the first electronic device 200 may determine that the second electronic device 201 satisfies the specified condition.

According to an embodiment of the present disclosure, the first electronic device 200 may determine whether the sudden stopping occurs in front of the first electronic device 200. The first electronic device 200 may determine whether the second electronic device 201 has suddenly stopped. The first electronic device 200 may determine whether the speed of the second electronic device 201 satisfies a predetermined condition (e.g., whether the speed is approximately zero). In the case where the speed of the second electronic device 201 satisfies a predetermined condition, the first electronic device 200 may determine whether traffic is congested. In the case where traffic jam is absent, the first electronic device 200 may determine that the specified condition is not satisfied. In the case where traffic jam is present, the first electronic device 200 may determine that the second electronic device 201 has suddenly stopped. In the case where the second electronic device 201 has suddenly stopped, the first electronic device 200 may determine that the second electronic device 201 satisfies the specified condition.

For example, the first electronic device 200 may determine whether the second electronic device 201 has suddenly stopped, based on i) whether the second electronic device 201 is located in front of the first electronic device 200, ii) whether the speed of the second electronic device 201 satisfies a predetermined condition, and/or iii) whether a distance between the first electronic device 200 and the second electronic device 201 is less than a predetermined distance.

In the case where the second electronic device 201 does not satisfy the specified condition in step 1303, the operation is ended.

In the case where the second electronic device 201 satisfies the specified condition, in step 1305, the first electronic device 200 may receive a video stream from the second electronic device 201. The first electronic device 200 may make a request for the video stream to the second electronic device 201. In the case where the first electronic device 200 makes a request for the video stream, a Wi-Fi direct communication service or a video stream service may be triggered.

Figure 14:
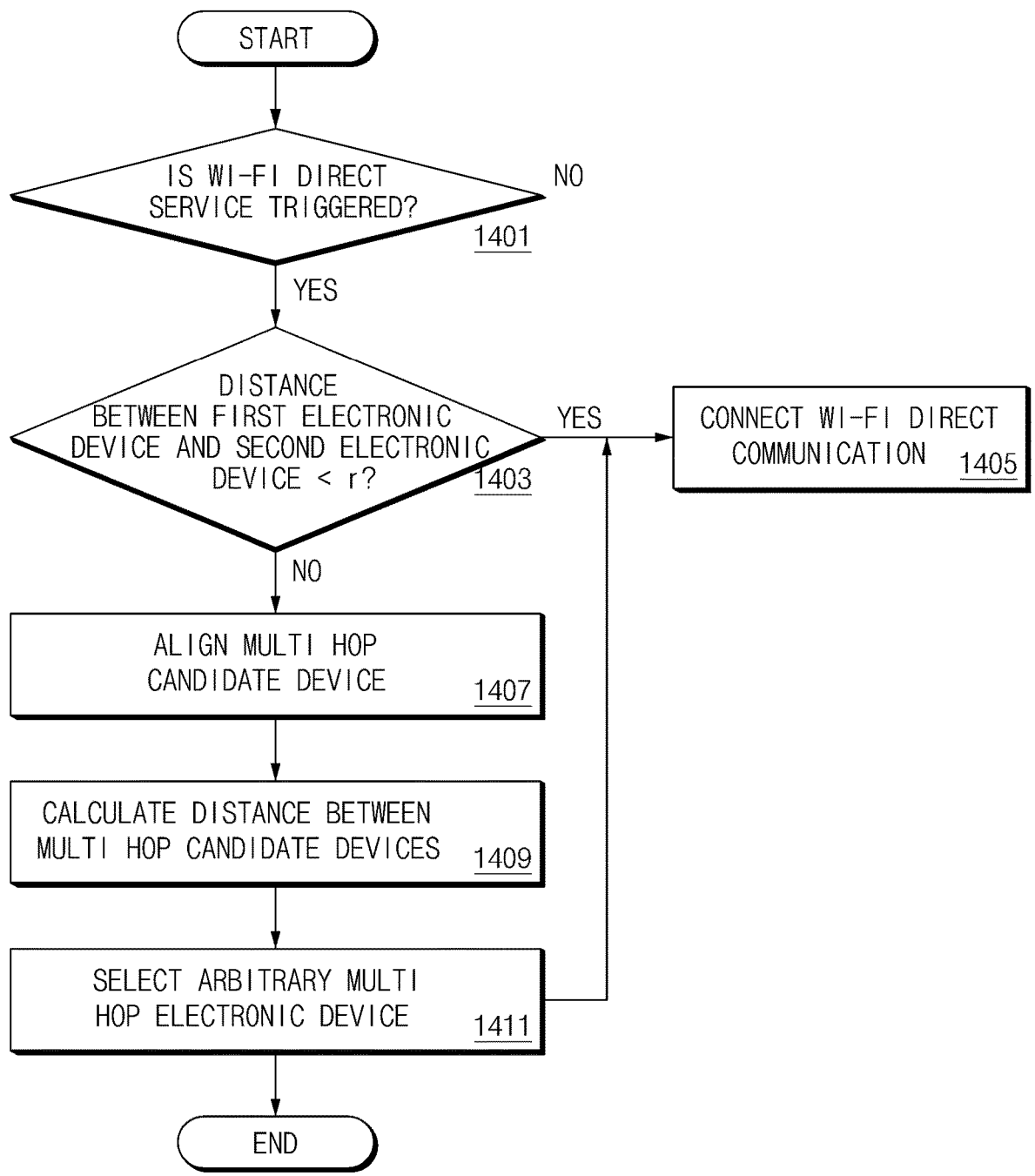
FIG. 14 is a flowchart of an operation of performing multi hop Wi-Fi direct communication between electronic devices, according to an embodiment of the present disclosure.

FIG. 14 is a flowchart of an operation of performing multi hop Wi-Fi direct communication between electronic devices, according to an embodiment of the present disclosure.

In the case where a first electronic device 200 hands over to Wi-Fi direct communication, the coverage area of which is smaller than the communication coverage area of V2X, a situation, in which multi hop communication with a second electronic device 201 may be required. Hereinafter, an operation in which the first electronic device 200 performing V2X communication connects to multi hop Wi-Fi direct will be described.

In step 1401, the first electronic device 200 may determine whether a Wi-Fi direct service is triggered. According to various embodiments of the present disclosure, the Wi-Fi direct service may be triggered depending on a triggering condition. If the Wi-Fi direct service is not triggered, the operation may be ended.

In the case where the Wi-Fi direct service is triggered, in step 1403, the first electronic device 200 may determine whether a distance between the first electronic device 200 and the second electronic device 201 satisfies a threshold. The threshold may correspond to the Wi-Fi direct communication coverage area of the first electronic device 200. In the case where the distance between the first electronic device 200 and the second electronic device 201 is less than the threshold, the first electronic device 200 may determine that the distance satisfies the threshold.

In the case where the distance between the first electronic device 200 and the second electronic device 201 satisfies the threshold, in step 1405, the first electronic device 200 may establish a Wi-Fi direct communication connection to the second electronic device 201. The first electronic device 200 may request a Wi-Fi direct communication connection and may establish the Wi-Fi direct communication connection.

In the case where the distance between the first electronic device 200 and the second electronic device 201 does not satisfy the threshold, in step 1407, the first electronic device 200 may align multi hop candidate devices. The multi hop candidate devices may be candidate devices for determining a multi hop electronic device that relays the Wi-Fi direct communication between the first electronic device 200 and the second electronic device 201. According to an embodiment of the present disclosure, the first electronic device 200 may determine at least one electronic device within a V2X coverage area as a multi hop candidate device. The first electronic device 200 may determine a multi hop candidate device in consideration of the direction of electronic devices within the V2X coverage area.

In step 1409, the first electronic device 200 may calculate a distance between the multi hop candidate devices. In step 1411, the first electronic device 200 may determine an arbitrary multi hop electronic device. For example, the first electronic device 200 may determine the multi hop electronic device based on the distance between the multi hop candidate devices. The first electronic device 200 may determine the multi hop electronic device based on the following equation.

$$\text{for } (i \text{ to } j-1), \{\text{Dis}(v_{i+1}-v_j)<r\} \quad (2)$$

In Equation (2), $v_i$ denotes a first multi hop electronic device, $v_j$ denotes a second multi hop electronic device, r denotes a threshold (Wi-Fi direct coverage area), dis denotes distance, and $\text{dis}(v_{i+1}-v_j)$ dinotes a distance between x and y. According to Equation (2), each of $v_i$ and $v_j$ may be selected as an electronic device in the case where multi hop candidate devices of an index lower than –j are included while a distance to $v_j$ between $v_i$ and $v_j$ satisfies a threshold. In this case, the distance between $v_i$ and $v_j$ needs to satisfy the threshold.

According to an embodiment of the present disclosure, the second multi hop device may be a multi hop candidate device, which is located farthest from the first multi hop electronic device, from among multi hop candidate devices satisfying the condition that a distance from the first multi hop electronic device satisfies the threshold.

The first electronic device 200 may perform step 1405 by using the determined first multi hop electronic device and the determined second multi hop electronic device.

Figure 15:
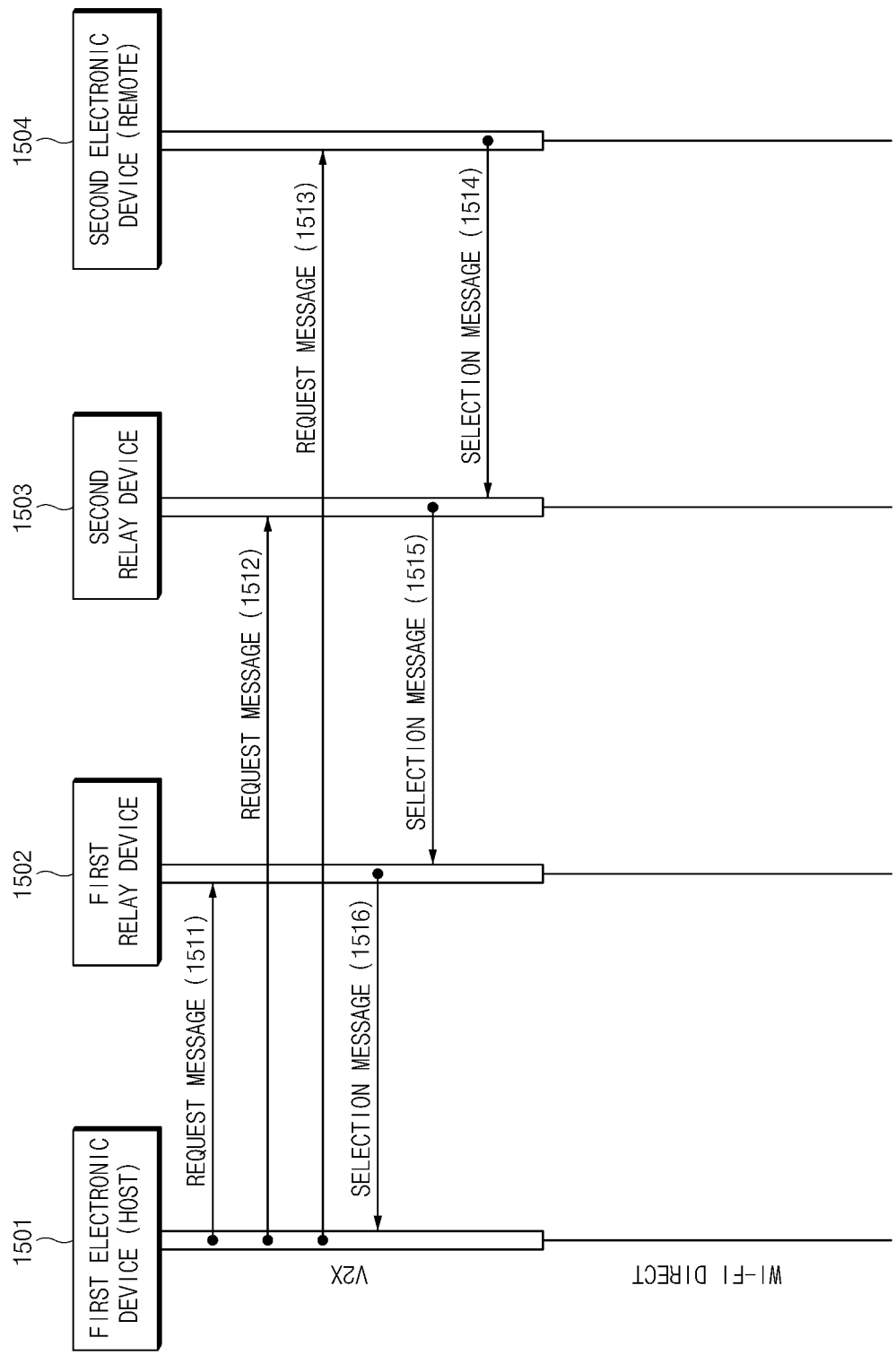
FIG. 15 is a diagram illustrating a method of forming multi hop topology, according to an embodiment of the present disclosure.

FIG. 15 is a diagram illustrating a method of forming multi hop topology, according to an embodiment of the present disclosure.

Hereinafter, in FIG. 15, the multi hop electronic device may be referred to as a first relay device 1502 or second relay device 1503.

The first electronic device 1501 may transmit request messages 1511, 1512, and 1513 to the first relay device 1502, the second relay device 1503, and a second electronic device 1504, respectively. Each of the request messages 1511, 1512, and 1513 may be transmitted with V2X communication. Each of the request messages 1511, 1512, and 1513 may include at least one of Wi-Fi direct connection information including at least one of WSC IE or P2P IE, transmitter device ID, receiver device ID, or a reachability flag. The request message may be referred to as a probe request message or connection request message.

According to an embodiment of the present disclosure, the transmitter device ID of each of the request messages 1511, 1512, and 1513 may indicate a first electronic device 1501, and the receiver device ID of the request messages 1511, 1512, and 1513 may indicate first relay device 1502, the second relay device 1503, and the second electronic device 1504, respectively. Each of the request messages 1511, 1512, and 1513 may include device information for P2P IE or Wi-Fi direct communication.

The first relay device 1502 may transmit a selection message 1516 to the first electronic device 1501 in response to the request message 1511. Wi-Fi direct communication between the first electronic device 1501 and the first relay device 1502 may be performed. In response to the request message 1512, the second relay device 1503 may transmit a selection message 1515 to the first relay device 1502, and Wi-Fi direct communication between the second relay device 1503 and the first relay device 1502 may be established. In response to the request message 1513, the second electronic device 1504 may transmit a selection message 1514 to the second relay device 1503. Wi-Fi direct communication between the second electronic device 1504 and the second relay device 1503 may be established. Each of the selection messages 1514, 1515, and 1516 may include at least one of Wi-Fi direct connection information (e.g., WSC IE or P2P IE), transmitter device ID, receiver device ID, and a reachability flag.

The second electronic device 1504 may transmit a video stream to the first electronic device 1501. The first relay device 1502 and second relay device 1503 may relay the video stream.

Figure 16:
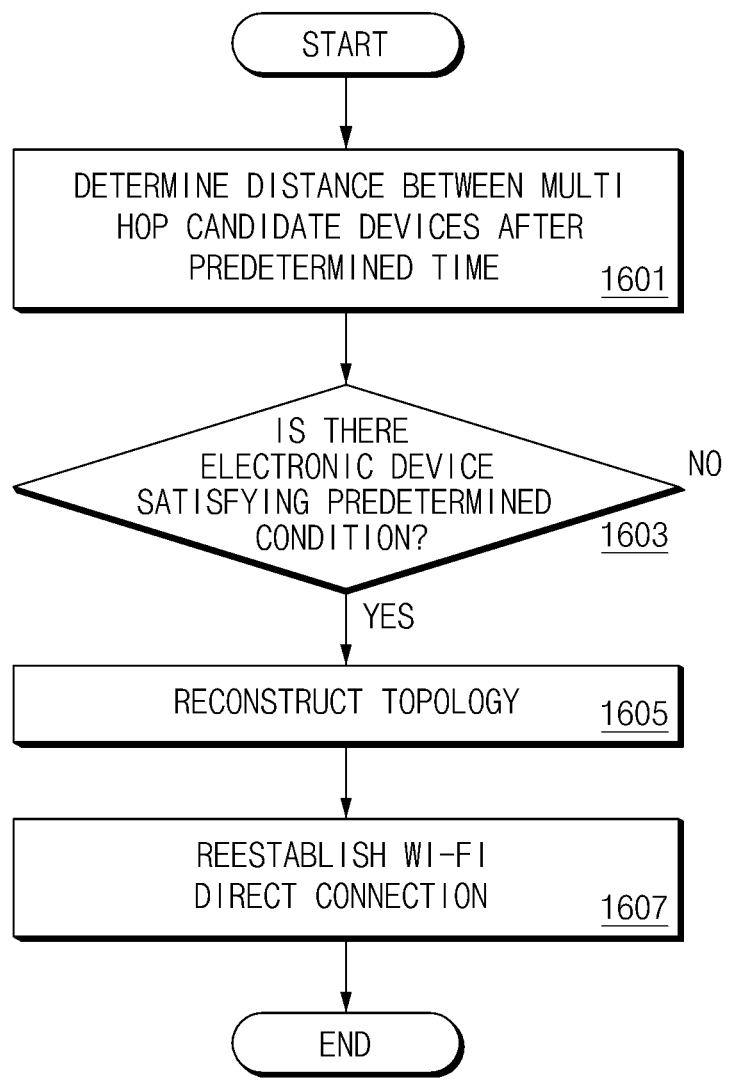
FIG. 16 is a flowchart of an operation for reconstructing a topology, according to an embodiment of the present disclosure.

FIG. 16 is a flowchart of an operation for reconstructing a topology, according to an embodiment of the present disclosure.

Over time, since the location of an electronic device within a V2X radius changes, the electronic device may predict a change in topology to reconstruct the topology before disconnecting. A first electronic device 1501 may reconstruct the topology for multi hop communication with a second electronic device 1504.

In step 1601, the first electronic device 1501 may determine a distance between the multi hop candidate devices, the first electronic device 1501, and/or the second electronic device 1504 after a predetermined time. The first electronic device 1501 may predict the distance between the multi hop candidate devices, the first electronic device 1501, and/or the second electronic device 1504 after the predetermined time based on a speed.

In step 1603, the first electronic device 1501 may determine whether there is an electronic device satisfying a predetermined condition. The first electronic device 1501 may determine whether the predetermined condition is satisfied, based on the following equation.

$$\Delta T(v_i - v_j) > r, \text{ (selected } i <, \ldots j <, \text{ remote)} \quad (3)$$

In Equation (3), $\Delta T$ may denote a predetermined time, $v_i$ may denote an electronic device (e.g., the first relay device 1502) of index i in the topology, $v_j$ may denote an electronic device (e.g., the second relay device 1503) of index j in the topology, Remote may denote an index of the second electronic device 1504, and i and j may have an index that becomes lower as a distance from the first electronic device 1501 decreases. In the case where there is an electronic device (e.g., an electronic device satisfying the predetermined condition that the distance satisfies the threshold) satisfying the predetermined condition that the distance between the multi hop candidate devices, the first electronic device 1501, and/or the second electronic device 1504 satisfies the threshold, the first electronic device 1501 may determine that the predetermined condition is satisfied.

In the case where the electronic device does not satisfy the predetermined condition, the operation may end.

In the case where the electronic device satisfying the predetermined condition is present, in step 1605, the first electronic device 1501 may reconstruct the topology.

In step 1607, the first electronic device 1501 may reestablish a Wi-Fi direct connection.

Figure 17:
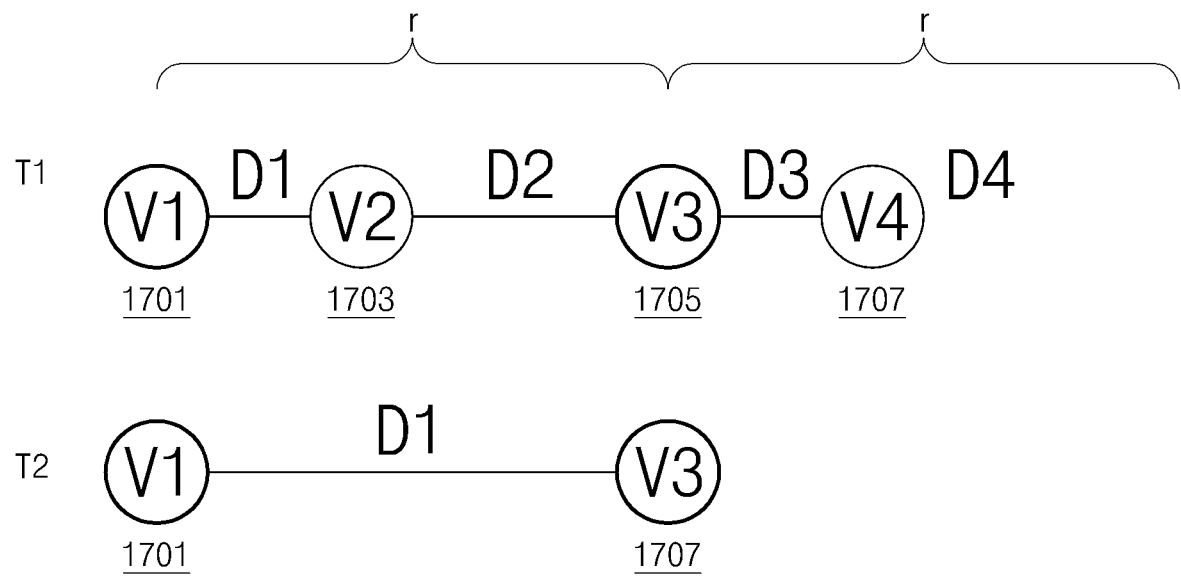
FIG. 17 illustrates an electronic device which reconstructs topology over time, according to an embodiment of the present disclosure.

FIG. 17 illustrates an electronic device which reconstructs a topology as time passes, according to an embodiment of the present disclosure.

Referring to FIG. 17, a first electronic device 1701 and a second electronic device 1707 may transmit or receive a video stream.

At time T1, the first electronic device 1701 may establish the topology including a second relay device 1705. A first relay device 1703 is not a multi hop candidate device since it is located farthest from the first electronic device 1701 from among multi hop candidate devices within a radius. Accordingly, the first relay device 1703 may not be included in the topology. The second relay device 1705 is located farthest from the first electronic device 1701 from among multi hop candidate devices within the radius. Accordingly, the second relay device 1705 may be included in a second topology.

At time T2, the second relay device 1705 may not satisfy a topology establishing condition. A distance between a second electronic device 1707 and the first electronic device 1701 may be less than a threshold. The first electronic device 1701 may perform Wi-Fi direct communication with the second electronic device 1707.

The term "module" used in this disclosure may refer to a certain unit that includes one of hardware, software, and firmware, or any combination thereof The term "module" may be interchangeably used with the terms "unit", "logic", "logical block", "component", and "circuit". The module may be the minimum unit, or part thereof, which performs one or more particular functions. The module may be implemented mechanically or electronically. For example, the module disclosed herein may include at least one of a dedicated processor, a CPU, an application specific integrated circuit (ASIC) chip, a field programmable gate array (FPGA), and a programmable-logic device, which are known or will are to be developed in the future.

At least some of the devices (e.g., modules or functions thereof) or methods (e.g., operations) according to various embodiments of the present disclosure may be implemented by an instruction which is stored in a computer-readable storage media in the form of a program module. The instruction, when executed by a processor (e.g., the processor 210), may cause the one or more processors to execute the function corresponding to the instruction. The computer-readable storage media, for example, may be the memory 230.

A computer-readable recording medium may include a hard disk, a floppy disk, a magnetic media (e.g., a magnetic tape), an optical media (e.g., a compact disc read only memory (CD-ROM) and a DVD), a magneto-optical media (e.g., a floptical disk)), and hardware devices (e.g., a read only memory (ROM), a random access memory (RAM), or a flash memory). Also, a program instruction may include not only assembly code such as things generated by a compiler but also high-level language code executable on a computer using an interpreter. The above hardware unit may be configured to operate via one or more software modules for performing an operation according to various embodiments of the present disclosure, and vice versa.

A module or a program module according to various embodiments of the present disclosure may include at least one of the above elements, or a part of the above elements may be omitted, or additional elements may be further included. Operations performed by a module, a program module, or other elements may be executed sequentially, in parallel, repeatedly, or in a heuristic manner. In addition, some operations may be executed in different sequences or may be omitted. Alternatively, other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   a communication circuit configured to support a first communication method and a second communication method; and
   at least one processor electrically connected to the communication circuit, and
   configured to:
      obtain connection information of a plurality of electronic devices via the first communication method;
      determine at least one candidate electronic device among the plurality of electronic devices based on a number of electronic devices within a threshold distance from the electronic device; and
      determine one electronic device from among the at least one candidate electronic device; and
      connect to the one electronic device from among the at least one candidate electronic device via the second communication method based on the obtained connection information.

2. The electronic device of claim 1, wherein a second coverage area according to the second communication method is smaller than a first coverage area according to the first communication method.

3. The electronic device of claim 2, wherein the one electronic device is located within the second coverage area.

4. The electronic device of claim 3, wherein another electronic device connected to the electronic device through the first communication method is located outside of the second coverage area.

5. The electronic device of claim 1, wherein the connection information includes at least one of an Internet protocol (IP) address and a key.

6. The electronic device of claim 1, wherein the at least one processor is further configured to:
receive image data from the one electronic device through the second communication method.

7. The electronic device of claim 6, further comprising:
a display electrically connected to the at least one processor,
wherein the at least one processor is further configured to:
output the image data on the display.

8. The electronic device of claim 1, further comprising:
a memory configured to store at least one program for implementing at least one of the first communication method and the second communication method.

9. The electronic device of claim 6, wherein the at least one processor is further configured to:
generate a request message for requesting the image data, based on the connection information.

10. The electronic device of claim 9, wherein the at least one processor is further configured to:
transmit the request message by using the first communication method.

11. The electronic device of claim 10, wherein the at least one processor is further configured to:
allow the communication circuit to receive an acceptance message for accepting the request as a response to the request message, from the one electronic device.

12. The electronic device of claim 11, wherein the at least one processor is further configured to:
determine whether the one electronic device is located in front of the electronic device, in response to the acceptance message; and
complete the communication connection to the one electronic device through the second communication method based on the determination result.

13. The electronic device of claim 1, wherein the first communication method includes vehicle-to-everything (V2X) communication.

14. The electronic device of claim 13, wherein the second communication method includes wireless-fidelity (Wi-Fi) direct communication.

15. A method in which an electronic device performs communication, the method comprising:
obtaining connection information of at least one electronic device through vehicle-to-everything (V2X) communication;
determining one electronic device from among the at least one electronice device based at least on state information of the at least one electronic device;
connecting to the one electronic device via wireless-fidelity (Wi-Fi) direct communication based on the obtained connection information; and
receiving data from the one electronic device through the Wi-Fi direct communication,
wherein the state information includes location information of the one electronic device.

16. The method of claim 15, wherein the connection information includes at least one of an IP address or a key.

17. The method of claim 15, wherein the data includes image data.

18. The method of claim 17, further comprising:
displaying the data received from the one electronic device, on a display.

* * * * *